United States Patent [19]
Nitadori et al.

[11] Patent Number: 5,084,173
[45] Date of Patent: Jan. 28, 1992

[54] HYDROPHILIC COMPOSITE POROUS MEMBRANE, A METHOD OF PRODUCING THE PLASMA SEPARATOR

[75] Inventors: Yoshiaki Nitadori, Oita; Toru Nakano, Nobeoka; Takeaki Hagihara, Oita, all of Japan

[73] Assignee: Asahi Medical Co., Ltd., Tokyo, Japan

[21] Appl. No.: 75,542

[22] Filed: Jul. 20, 1987

Related U.S. Application Data

[63] Continuation-in-part of Ser. No. 856,207, Apr. 28, 1986.

[30] Foreign Application Priority Data

| May 27, 1985 | [JP] | Japan | 60-112129 |
| May 27, 1985 | [JP] | Japan | 60-112130 |
| Jul. 21, 1986 | [JP] | Japan | 61-169848 |

[51] Int. Cl.$^5$ ............................................. B01D 69/00
[52] U.S. Cl. ........................... 210//321.89; 210/490; 210/500.36; 210/500.42; 427/245
[58] Field of Search ................ 427/244, 245, 246; 210/500.36, 490, 491, 500.42, 321.89; 264/41, 49

[56] References Cited

U.S. PATENT DOCUMENTS

| 3,853,601 | 12/1974 | Taskier | 117/98 |
| 3,929,509 | 12/1975 | Taskier | 136/146 |
| 4,214,020 | 7/1980 | Ward et al. | 427/296 |
| 4,269,713 | 5/1981 | Yamashita et al. | 210/500.2 |
| 4,401,567 | 8/1983 | Shindo et al. | 210/500.2 |
| 4,432,875 | 2/1984 | Wrasidlo et al. | 210/500.2 |
| 4,501,793 | 2/1985 | Sarada | 210/500.2 |
| 4,657,743 | 4/1987 | Kahno | 210/321.8 |
| 4,696,748 | 9/1987 | Hitadori et al. | 210/500.23 X |

FOREIGN PATENT DOCUMENTS

| 53-21270 | 2/1978 | Japan. |
| 53-134871 | 11/1978 | Japan. |
| 54-8669 | 1/1979 | Japan. |
| 54-17978 | 2/1979 | Japan. |
| 57-66114 | 4/1982 | Japan. |
| 57-84702 | 5/1982 | Japan. |

Primary Examiner—Frank Spear
Attorney, Agent, or Firm—Birch, Stewart, Kolasch & Birch

[57] ABSTRACT

A novel hydrophilic composite porous membrane is obtained by applying a specific copolymer solution onto the overall surface of an oriented polyolefin membranous matrix comprising a plurality of microfibrils and a plurality of knotted portions cross-connected to the microfibrils, followed by drying. The copolymer is water-insoluble and is comprised of hydrophilic monomeric units and hydrophobic monomeric units in a specific ratio. In the obtained composite porous membrane, the microfibrils are bonded together by means of the copolymer, thereby forming bundles and a coat of the copolymer is formed on the overall surface of the bundles and knotted portions. The membrane has therewithin pores which are substantially elliptic in the cross section taken along the same direction as the longitudinal direction of the microfibril bundles and has on both surfaces thereof openings which are substantially elliptic as viewed against the surface of the membrane. The membrane exhibits a high permeability for high molecular weight components and has high hydrophilic properties, so that the membrane is especially useful for plasma separation.

25 Claims, 6 Drawing Sheets

OUTER WALL SURFACE

INNER WALL SURFACE

← ORIENTATION DIRECTION →

FIG.8A
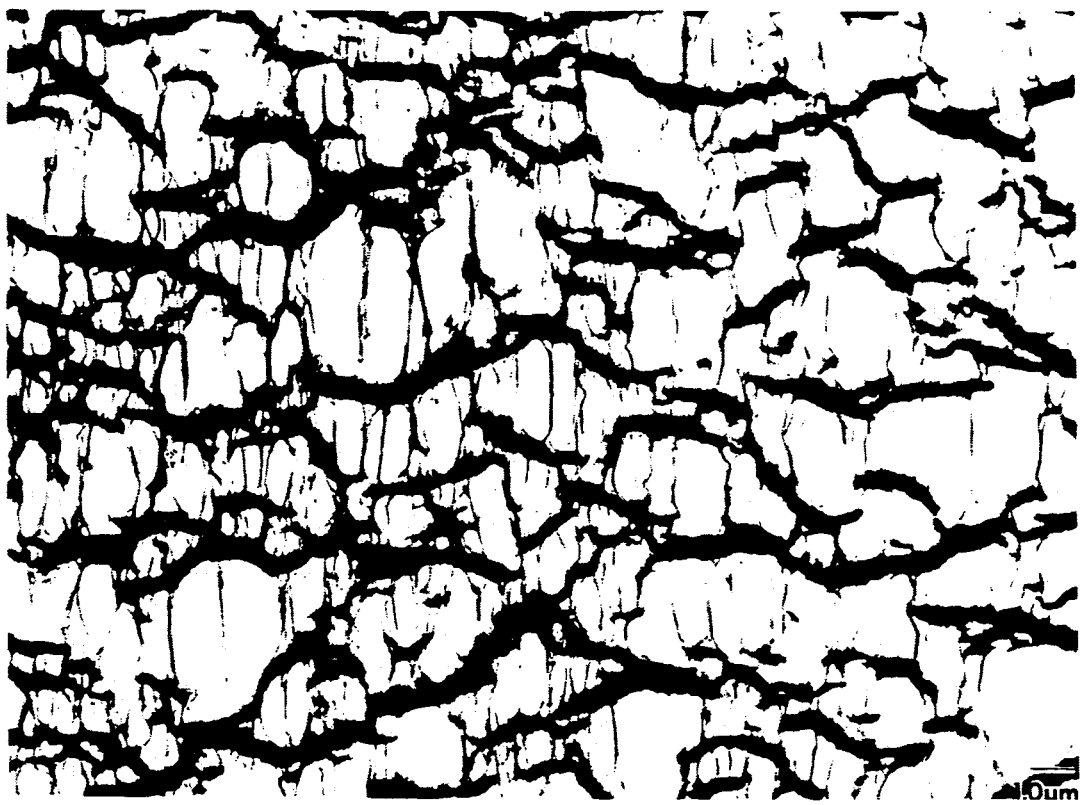
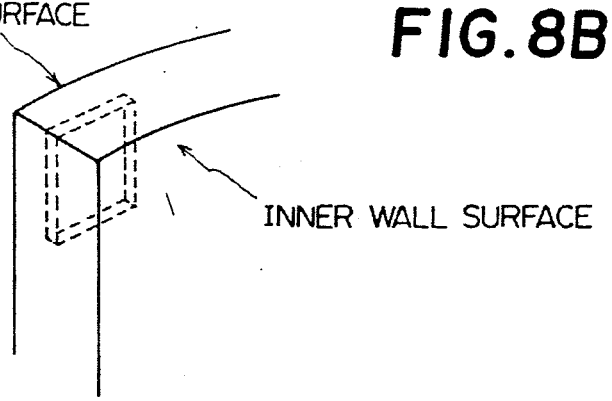
FIG.8B

HYDROPHILIC COMPOSITE POROUS MEMBRANE, A METHOD OF PRODUCING THE PLASMA SEPARATOR

This application is a continuation-in-part of copending U.S. patent application Ser. No. 856,207 filed on Apr. 28, 1986.

BACKGROUND OF THE INVENTION

Field of The Invention

The present invention relates to a hydrophilic composite porous membrane, a method of producing the same and a plasma separator in which the hydrophilic composite porous membrane is accommodated. More particularly, the present invention is concerned with a hydrophilic composite porous membrane comprising microfibril bundles, knotted portions cross-connected to the bundles and a specific copolymer coat formed substantially on the overall surface of the bundles and knotted portions. The membrane may take various forms, for example a hollow fiber form, and exhibits an excellent water or solute permeability without being subjected to any pretreatment and has excellent mechanical properties in the wet state as well as in the dry state. The present membrane advantageously does not contain any undesirable materials, such as a surfactant, a water-soluble polymer, etc., which had inevitably been used in rendering hydrophobic membranes hydrophilic according to the conventional methods. The present invention is also concerned with an effective method of producing the above-mentioned membrane in which a copolymer solution is applied to a polyolefin membranous matrix, followed by drying. Moreover, the present invention is concerned with a plasma separator containing the above-mentioned advantageous membrane.

DISCUSSION OF RELATED ART

In recent years, various porous polymeric membranes have been widely utilized for the ultrafiltration of aqueous solutions or for the filtration of aqueous suspensions. For example, in the industrial fields, these membranes are utilized for the production of pure water, which must be supplied in a large volume in the electronic industry, and for the removal of bacterium from the water to be used for the production of pharmaceuticals. These membranes are also widely utilized as battery separators. In medical fields, these membranes are utilized for the separation of blood components, for the removal of malignant substances from abdominal ascites and for the removal of foreign matters from various transfusion liquids. These membranes are also widely utilized as various bacterium removing filters.

The porous polymeric membranes are generally employed to separate solutes or suspended materials from an aqueous medium or other solvent media according to their molecular size. Accordingly, it is necessary that the porous polymeric membranes exhibit high filtration rates, preventing higher molecular weight components from permeating therethrough while allowing lower molecular components to freely permeate therethrough. It is also necessary that the porous polymeric membranes have a high mechanical strength. specifically, when the porous polymeric membranes are used for plasma separation in an apparatus for separating plasma from the blood for therapeutic and plasma collection purposes, they should have the following functions and properties:

(1) the membranes should be suited to cause all of the intended plasma components to permeate through the membranes while inhibiting the permeation of blood corpuscles;

(2) the membranes should be suited to build a compact apparatus and exhibit a high plasma separation efficiency;

(3) their safety should be high; and (4) their handling and operation should be facile.

With respect to item (1) above, the smallest of the blood corpuscles to be inhibited from permeation through the membranes is thrombocyte having a diameter of 2 to 3 $\mu$m. Therefore, the porous polymeric membranes should have pores capable of inhibiting permeation of particles having the above-mentioned size. Intended components to be passed through the membrane may vary depending on the purpose of effecting a plasma separation. In the case of a medical treatment, the plasma of a patient suffering from a disease caused by an abnormality in plasma components is separated and replaced by a fresh plasma, or alternatively the separated plasma is subjected to clean-up to remove the causative substance and then returned to the patient. As such diseases, there may be mentioned, for example, autoimmune diseases such as rheumatoid arthritis and systemic lupus erythematosus, hyperlipemia and the like. Examples of substances to be removed are immunoglobulin which is an autoantibody, immune complexes which are produced in the case of autoimmune diseases, and low density lipoprotein (hereinafter referred to as "LDL") which is produced in the case of hyperlipemea. Such substances to be removed generally have a high molecular weight and are large in molecular size. For example, IgM which is a kind of immunoglobulin has a molecular weight of 900,000 and a size of 35 nm, and immune complexes which are not known with respect to their exact structures are estimated to have a molecular weight from 1,000,000 to several millions and a size of about 20 to 50 nm. LDL is also a macromolecule having a molecular weight of 2,200,000 to 3,500,000 and a size of 20 to 30 nm. Plasma separation for collecting plasma is intended to collect useful plasma components, in which plasma may be collected from volunteers by means of direct extracorporeal circulation or alternatively plasma may be collected from stored blood. In any case, a useful intended plasma protein should be permeated as a plasma component. Fraction preparations obtained from plasma include one having a relatively low molecular weight such as albumin having a molecular weight of 60,000 and a molecular size of 4×15 nm, one having a high molecular weight such as immunoglobulin as mentioned above and fibrinogen having a molecular weight of 340,000 and a molecular size of 3×70 nm, and also one having a molecular weight of 1,000,000 to 2,000,000 such as Coagulation Factor VIII used for the treatment of hemophilia. As mentioned above, the plasma components to be passed through the membrane often have a molecular size up to several ten nanometers in both of the cases of medical treatment and plasma collection.

With respect to item (2) above, in many cases, plasma separation is effected by introducing blood into a plasma separator from bodies of patients or volunteers by means of direct extracorporeal circulation. To minimize the burden upon the patients or volunteers as much as possible, it is desirable that blood separation can be completed within a short period of time, and that the amount of blood to be extracorporeally circulated is as little as possible. A membrane in the form of a hollow fiber is advantageous over a plane membrane in that a separation device can be made compact, thereby leading to a reduced extracorporeal circulation volume. Hence, a membrane having an improved filtration rate in the form of hollow fibers is desirable because it leads to not only a device of small size but also reduction in time required for plasma separation.

With respect to item (3) above, safety is very important since the plasma separator is generally employed for medical treatment. Accordingly, the membrane to be incorporated in the plasma separator must have a sufficient strength and must be free from leakage problems. The membrane must not contain any elutable matters, and must be highly compatible with the blood. The membrane must not have any unfavorable influence on the blood, and especially must not cause hemolysis problems. With respect to the above-mentioned hemolysis, it is recognized that hemolysis has a close relation with the pore size of a porous membrane. It is also recognized that when the pore is expanded to have a pore diameter, for example 1.0 μm or more in order to increase the molecule size to be fractionated by the membrane, erythrocytes tend to penetrate into the pores, thereby causing hemolysis to be apt to occur.

The porous polymeric membranes may be prepared by a customary wet membrane forming method (see, for example, U.S. Pat. No. 3,615,024) or by a customary melt phase-inversion method in which the polymer is mixed with an additive such as a plasticizer followed by melt forming and subjected to extraction of the additive for removal (see, for example, U.K. Patent No. 20 26 935). Alternatively, the porous polymeric membranes may be prepared by a customary stretching perforation method as described below, which can be advantageously employed for a hydrophobic crystalline polymer (see, for example, U.S. Pat. No. 4,401,567).

Of the above-mentioned customary methods for preparing porous polymeric membranes, the stretching perforation method is most preferred. The reason is that the porous polymeric membrane obtained by this process is a valuable membrane ensuring high safety in applications to medical treatment, because no additives such as organic solvents or plasticizers are added during the preparation process of the porous membrane. For forming slits in the membrane, no additive extracting step is required, and the membrane is free from problems of dissolution-out of the remaining additives at the time of using the membrane.

In the preferred stretching perforation method, a hydrophobic crystalline polymer is melt molded to form a preliminary membrane which is subjected to cold stretching to cause cleavages among crystalline lamellae of the membrane and then subjected to hot stretching to attain a slit expansion of the membrane, thereby forming substantially rectangular slits (numeral 3 of FIG. 5 appended hereto which is a schematic illustration of one surface of the membrane as prepared to according to the customary stretching perforation method) which are defined by microfibrils (numeral 1 of FIG. 5) oriented in the stretching direction and knotted portions (numeral 2 of FIG. 5) that are cross-connected to the microfibrils and are each in the form of stacked lamellae. The diameter of the microfibrils is in the range of from several hundred to several thousand angstroms, and the length of the microfibrils is in the range of several thousand to several ten thousand angstroms. On the other hand, the thickness of the knotted portions is about several to several ten times the diameter of the microfibrils, and the length of the knotted portions is generally very large. The slits include intermediate slits which are present within the wall of the porous membrane in a communicating relationship and end slits which open at the inner and outer wall surfaces (see FIGS. 3 and 4 appended hereto) of the membrane. The slits form throughpaths running from the inner wall surface of the membrane to the outer wall surface of the membrane. Examples of the hydrophobic crystalline polymers to be employed in the stretching perforation method are polyethylene, polypropylene, polyacetal or the like. Of these polymers, a high density polyethylene is a preferred material for preparing a membrane, since it has an excellent moldability thereby to facilitate preparation of a membrane and has a high crystallinity which is advantageous to obtain a porous membrane having a relatively large slit diameter. Hence, various porous membranes have been proposed which are produced by the above-described stretching perforation of a high density polyethylene (see, for example, U.S. Pat. No(s). 3,558,764, 3,679,538 and 4,401,567).

The porous polymeric membranes manufactured according to the stretching perforation method have advantages as mentioned hereinbefore. However, these membranes have a drawback. The drawback is as follows. The slits of these membranes are defined by microfibrils and knotted portions, which are each substantially rectangular, as mentioned hereinbefore. The ratio of the length of the longitudinal side of each substantially rectangular slit to that of the lateral side of the slit is about 10 or more. Permeation of particles through the membrane is mainly controlled by the lateral side having a smaller length. Whilst the length of the longitudinal side can be readily increased by increasing the stretching ratio of the membrane, the length of the lateral side cannot be increased to a desirable extent even if the stretching ratio of the membrane is increased. Moreover, excessive stretching of the membrane tends to cause breakage of microfibrils and plastic deformation of stacked lamellae of the membrane, thereby causing the membrane to undergo membrane breakage, uneven wall thickness, or the like. Therefore, the slits of the polymeric membranes manufactured according to the stretching perforation method have been unable to have slits of large lateral side which are desirable to permit permeation of high molecular weight components through the membrane. For example, the membranes as disclosed in the Examples of the specification of U.S. Pat. No. 4,401,507 exhibit a permeation rate as low as about 50% or more) for Blue Destran 2000 having a molecular weight of about 2,000,000 (a product of Pharmacia Fine Chemicals, Sweden which is produced by bonding a dye to dextran). In Table 5 of the specification of this U.S. patent it is shown that there is a difference of 5% or more between the albumin permeability and the total protein permeability. This suggests that the molecular size fractionated by the membranes of the U.S. Patent is relatively small, although there is no disclosure in the patent with respect to the permeability of high molecular proteins. Moreover, Experiment No. 9 of the patent discloses a membrane exhibiting an excellent permeation rate for a high molecular weight substance such as Blue Dextran 2000, which is obtained by increasing the stretching ratio of the membrane to a high value such as 600%.

However, stretching the membrane to a high ratio such as 600% is accompanied by an undesirable plastic deformation as is apparent from comparison of Table 1 indicating that the membrane before stretching has an inner diameter of 210 μm and a wall thickness of 27 μm with Table 2 indicating that the membrane after stretching has an inner diameter of 160 μm and a wall thickness of 27 μm. Since this undesirably high plastic deformation tends to cause membrane breakage and unevenness of diameter, stretching the membrane to a high ratio such as 600% is not an appropriate method for increasing the fractionatable molecular size as mentioned above.

The porous polymeric membranes manufactured according to the stretching perforation method have another drawback. That is, since these membranes are generally hydrophobic, the wall surfaces of slits of the membranes cannot be wetted by aqueous liquids. Hence, aqueous liquids cannot effectively permeate the slits of these membranes. Accordingly, the porous polymeric membranes manufactured according to the stretching perforation method must be subjected to a treatment for giving hydrophilicity before use for the filtration of aqueous suspensions or for the ultrafiltration of aqueous solutions.

In this connection, the following is to be noted. The porous polymeric membranes may be, according to the property of the material, classified into two groups, namely hydrophilic porous membranes and hydrophobic porous membranes. Examples of the known hydrophilic porous membranes are cellulose porous membranes, cellulose derivative porous membranes, polyvinyl alcohol membranes, membranes made of an ethylene-vinyl alcohol copolymer and the like. The hydrophilic porous membranes are advantageous in that due to the hydrophilic property of the wall surfaces of pores of the membranes, these can be readily wetted with water so that the filtration of an aqueous suspension or the ultrafiltration of an aqueous solution can be conducted without any specific pretreatment. However, the hydrophilic porous membranes have such disadvantages that the mechanical strength of the membranes is poor in the wet state and the membranes seriously swell with water. The hydrophilic porous membranes also have the disadvantage in that at the time of drying the membranes in the wet state, degradation of the properties of the membranes tends to occur. On the other hand, examples of the known hydrophobic porous membranes are polyethylene porous membranes, polypropylene porous membranes, polysulfone porous membranes, polytetrafluoroethylene porous membranes and the like. These hydrophobic porous membranes are advantageous in that their swelling with water occurs only slightly and that even when the membranes are wetted, the mechanical strength of the membranes is not lowered to any great extent. Therefore, these membranes are widely utilized for the filtration of aqueous suspensions or for the ultrafiltration of aqueous solutions. However, these hydrophobic membranes have the drawback in that they must by subjected to treatment for providing hydrophilicity before being used for the filtration of aqueous suspensions or for the ultrafiltration of aqueous solutions.

In the foregoing situation, it has been proposed to render the hydrophobic porous membranes hydrophilic in advance. For example, the render the hydrophobic porous membranes hydrophilic, a first method has been proposed in which the pores of the hydrophobic porous membrane are filled with a water miscible organic solvent having a low surface tension and then the organic solvent is replaced by water. In a second method the hydrophobic porous membrane is treated with a surface active agent such as a surfactant comprising a silicon glycol copolymer or the like and is disclosed in, for example, U.S. Pat. No(s). 3,853,601 and 3,929,509. The first method has however a drawback that when the membrane is dried, for example, in order to conduct ethylene oxide sterilization of the membrane, the effect of the pretreatment is lost, thereby making it necessary to repeat the same procedure once more. In the second method, the surface active agent dissolves or disperses in an aqueous liquid at the time of filtration or ultrafiltration, thereby contaminating the aqueous liquid. Moreover, the second method has such a drawback that the effect of the pretreatment for rendering hydrophilic is lost with the lapse of time. In an attempt to eliminate these drawbacks, various proposals have been made (see, for example, Japanese Patent Application Laid-Open Specification No(s). 53-21270/1978, 53-134871/1978, 54-8669/1979 and 54-17978/1979). These specifications disclose hydrophilic composite porous membranes as prepared by filling the pore spaces of a hydrophobic porous membrane with an aqueous solution of a water-soluble high polymer and insolubilizing the water-soluble high polymer by a post-crosslinking treatment such as irradiation with ionizing radiation, thereby causing the polymer to be fixed to the wall surfaces of pores of the membrane. Since the water soluble high polymers have a high solubility parameter whereas the hydrophobic high polymers have a low solubility parameter, their affinity is poor and hence their adherence is poor. According to the methods of the above-mentioned Japanese patent application laid-open specifications, the water soluble high polymer is crosslinked to form a three-dimensional structure by a post-treatment so that the water soluble high polymer is fixed to the hydrophobic porous polymer constituting the membrane, thereby obtaining a hydrophilic composite porous membrane. However, the hydrophilic composite porous membrane has such a drawback that due to the use of a water soluble high polymer, the water soluble high polymer remaining uncrosslinked dissolves into the aqueous liquid at the time of filtration or ultrafiltration when the crosslinking treatment thereof is insufficiently effected. Further, the hydrophilic composite porous membranes have such a drawback that when the crosslinking degree of the water soluble polymer is high, the pore diameter of the membrane decreases, thereby causing the water permeability of the membrane to be disadvantageously lowered. Still further, from the practical point of view, the post-crosslinking treatment necessitates complicated procedures and especially, the irradiation with ionizing radiation requires a large-scale facility, causing the production cost to increase disadvantageously.

As reviewed above, the porous polymeric membranes manufactured according to the stretching perforation method have advantages in respect of safety over those manufactured according to the other customary methods for manufacturing porous polymeric membranes. However, as mentioned before, the porous polymeric membranes manufactured according to the stretching perforation method have inherent problems, i.e. the difficulty in increasing the length of the lateral side of the substantially rectangular slits of the membrane and the necessity of the treatment for imparting hydrophilicity. The efforts in the art for resolving the inherent problems of these membranes have not been successful. Therefore, there is a strong demand in the art for a porous polymeric membrane manufactured according to the stretching perforation method which membrane can exhibit a high permeability for high molecular weight components and has hydrophilic properties.

SUMMARY OF THE INVENTION

The present inventors have made extensive and intensive studies to develop a porous polymeric membrane manufactured according to the stretching perforation method which membrane can exhibit a high permeability for high molecular weight components and has hydrophilic properties. As a result, the inventors have unexpectedly found that a hydrophilic composite porous membrane comprising microfibril bundles, knotted portions cross-connected to the bundles and a specific copolymer coat formed substantially on the overall surface of the bundles and knotted portions which membrane has pores being substantially elliptic in the cross section taken along the same direction as the longitudinal direction of the bundles and openings being substantially elliptic as viewed against the surface of the membrane, exhibits a desirably high permeability for high molecular weight components and has desirably hydrophilic properties. Based on this novel finding, the present invention has been completed.

It is, therefore, an object of the present invention to provide a hydrophilic composite porous membrane which can be used without any pretreatment for the filtration of aqueous suspensions or ultrafiltration of aqueous solutions, and which is excellent in permeability for high molecular weight components and mechanical strength in the wet state as well as in the dry state, and also excellent in safety in medical applications.

It is another object of the present invention to provide an effective method of producing such an excellent hydrophilic composite porous membrane.

It is a further object of the present invention to provide a novel plasma separator which can be used without any pretreatment and which is excellent in plasma separation ability and safety in medical applications.

The foregoing and other objects, features and advantages of the present invention will be apparent to those skilled in the art from the following description and appended claims taken in connection with the accompanying drawings.

BRIEF DESCRIPTION OF THE DRAWINGS

In the drawings:

FIG. 8 is a transmission electron photomicrograph ($\times 6500$ in magnification) of an ultra thin slice which has been obtained by cutting, as indicated in FIG. 8, the wall portion of the hydrophilic composite porous membrane in the form of a hollow fiber according to the present invention as prepared in Example 8 which will be presented later.

Figure 1:
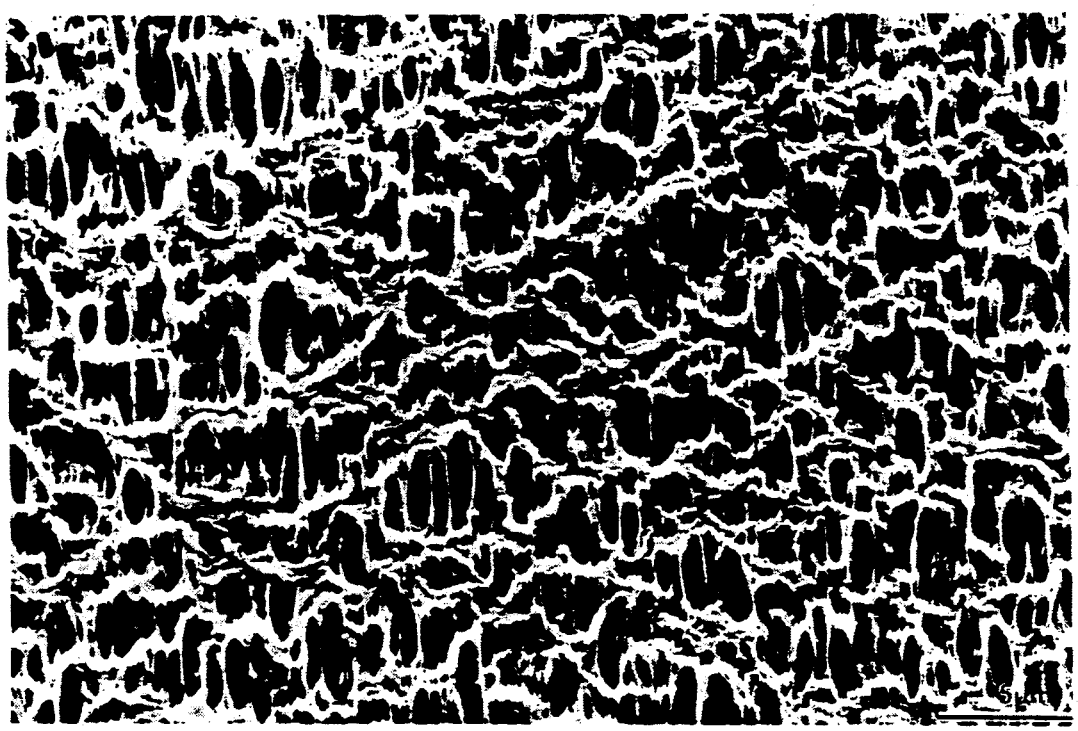
FIGS. 1 and 2 are scanning electron photomicrographs ($\times 3600$ and $\times 12,000$ in magnification, respectively) of a portion of the inner wall surface of the hydrophilic composite porous membrane in the form of a hollow fiber according to the present invention as prepared in Example 8 which will be presented later.

In the present invention, the term "slit" used herein has a meaning as apparent from the above description and more illustratively it means a space present in an oriented polyolefin membranous matrix which is a starting material for producing the hydrophilic composite porous membrane of the present invention, which space is defined by the microfibrils and knotted portions of the matrix and has a substantially rectangular cross section. On the other hand, in the present invention, the term "pore" used herein has a meaning as apparent from the above description and more illustratively it means a space present in the hydrophilic composite porous membrane of the present invention, which space is defined by the microfibril bundles and coated knotted portions of the present membrane and has a substantially elliptic cross section.

DETAILED DESCRIPTION OF THE INVENTION

In one aspect of the present invention, there is provided a hydrophilic composite porous membrane comprising:
microfibril bundles,
knotted portions cross-connected to said microfibril bundles, and each having a stacked structure of lamellae, and
a copolymer coat formed substantially on the overall surface of the microfibril bundles and the knotted portions,
each microfibril bundle comprising a plurality of microfibrils bonded together by means of the copolymer,
the microfibril bundles having thereon the copolymer coat cooperating with the knotted portions having thereon the copolymer coat to form a membranous structure having pores therewithin and openings on both surfaces thereof, the pores and the openings forming throughpaths running between both the surfaces of the membranous structure,
the pores being substantially elliptic in the cross section taken along the same direction as the longitudinal direction of the microfibril bundles, the openings being substantially elliptic as viewed against the surface of the membranous structure, the microfibrils and the knotted portions being comprised of a polyolefin, the copolymer being water-insoluble and being comprised of hydrophilic monomeric units and hydrophobic monomeric units, and having a hydrophilic monomeric unit content of from 40 to 90 % by weight based on the weight of the copolymer.

The hydrophilic composite porous membrane of the present invention has a structure in which a coat made of a copolymer comprising hydrophilic monomeric units and hydrophobic monomeric units is formed on substantially the overall surface of a hydrophobic polyolefin porous matrix. Due to the structure, like the hydrophobic porous membranes, the hydrophilic composite porous membrane of the present invention scarcely swells with water and the mechanical strength of the membrane scarcely decreases even when it is contacted with an aqueous solution. Further, due to the hydrophilic coat of the membrane, the membrane is readily wetted with water and can be used as a filter membrane for an aqueous liquid without any pretreatment for rendering the membrane hydrophilic. Still further, the dimension and performance of the membrane scarcely vary even when the membrane is repeatedly subjected to wetting and drying operations. Therefore, in producing the membrane, drying can be readily effected without using a wetting agent such as glycerin, which is generally employed to prevent the structure of a hydrophilic porous membrane from undergoing undesirable deformations. Still further, since it is unnecessary to use a surface active agent for rendering the membrane hydrophilic, the membrane of the present invention is a clean membrane that does not substantially contain any contaminants which will dissolve into and contaminate an aqueous suspension or solution to be treated.

Figure 2:
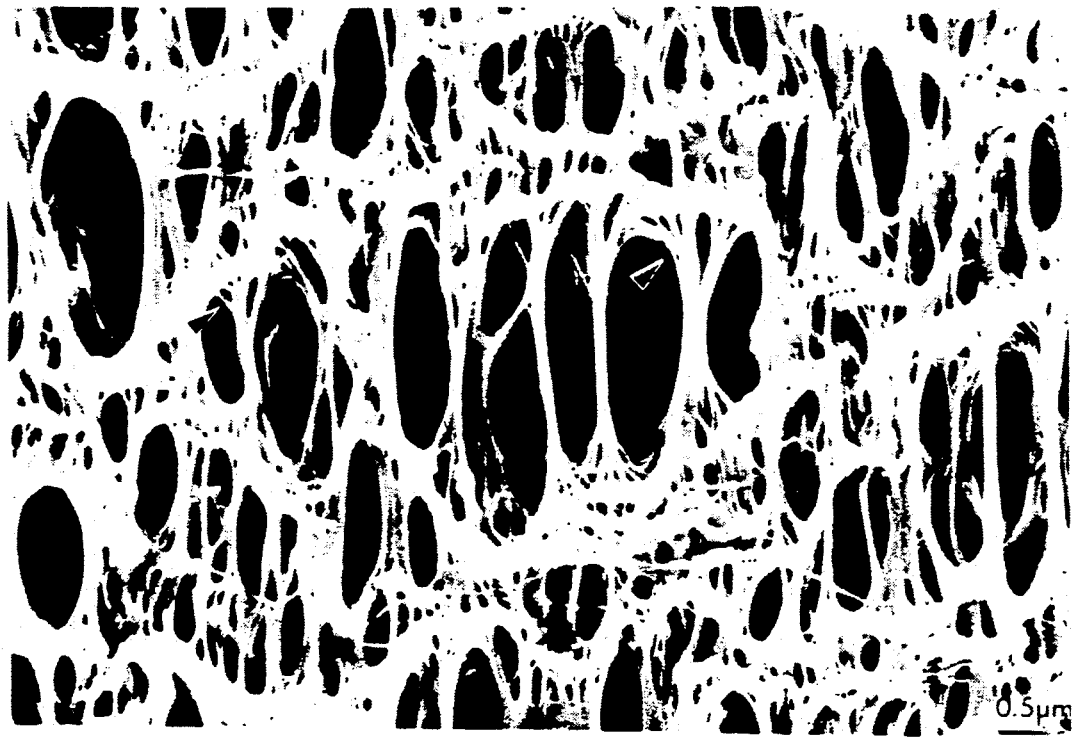
Figure 3:
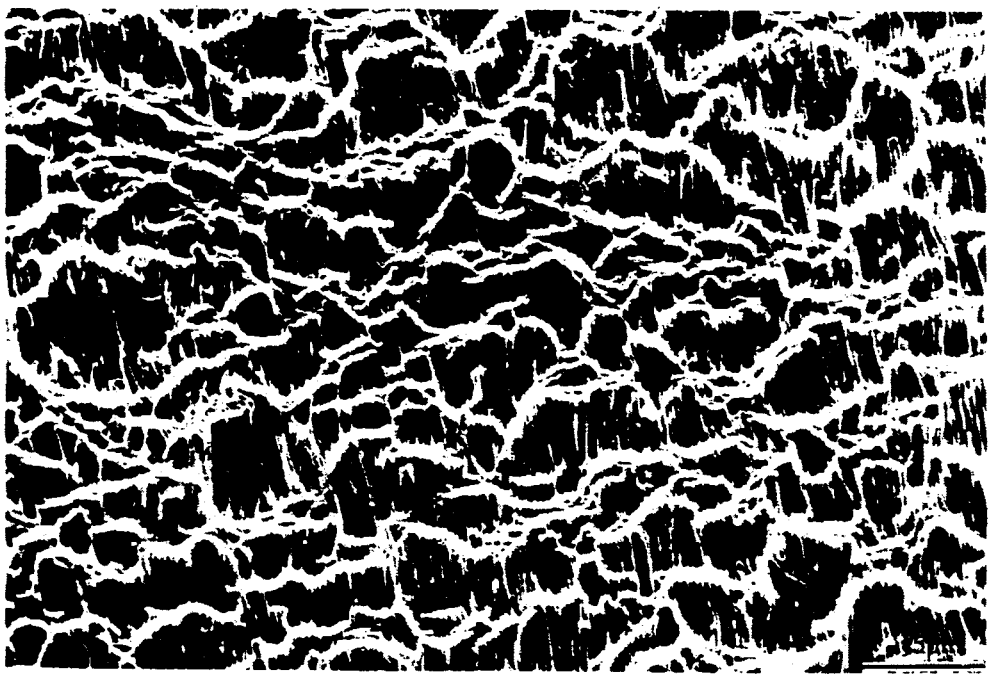
FIGS. 3 and 4 are scanning electron photomicrographs ($\times 3600$ and $\times 12,000$ in magnification, respectively) of a portion of the inner wall surface of a porous oriented polyolefin membranous matrix in the form of a hollow fiber to be employed in the manufacture of the hydrophilic composite porous membrane of the present invention, which matrix is obtained according to the procedure of Example 8 which will be presented later.
Figure 4:
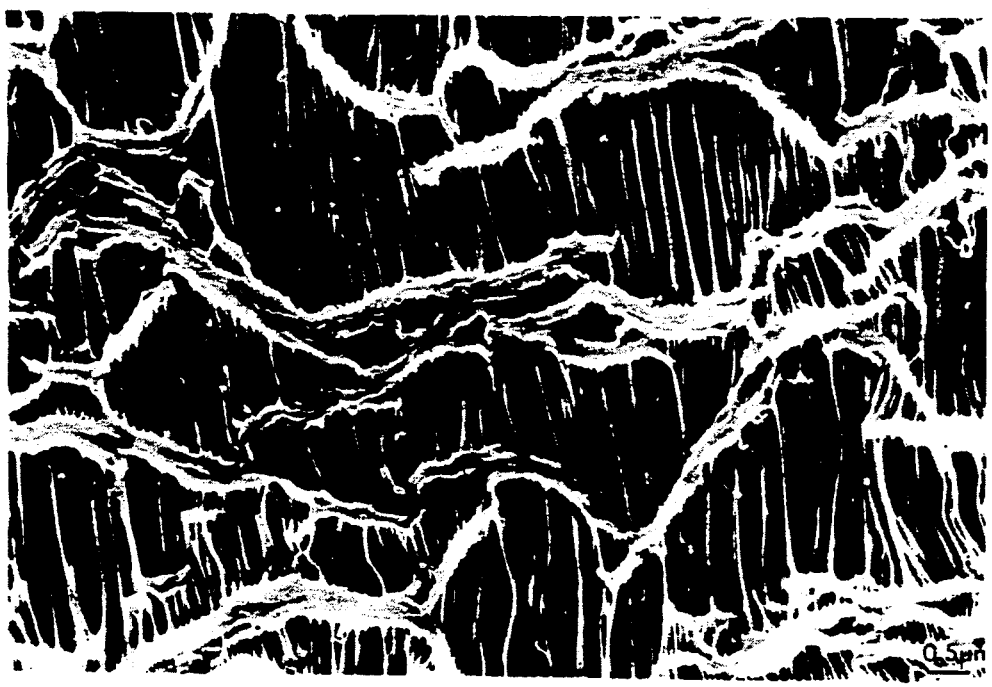
Figure 5:
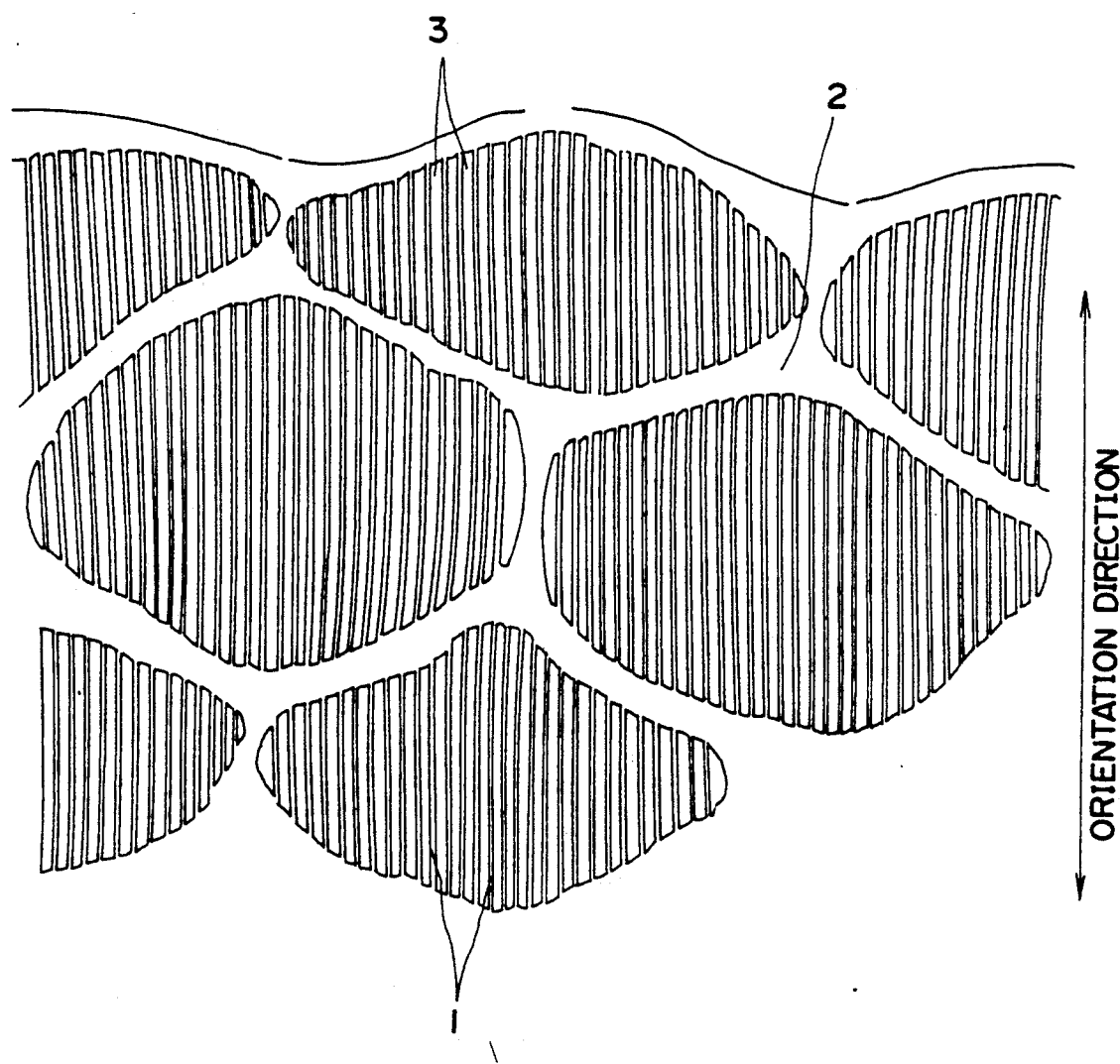
FIG. 5 is a schematic illustration of the photomicrographs of FIGS. 3 and 4 in which numeral 1 denotes a microfibril, numeral 2 denotes a knotted portion and numeral 3 denotes a slit which is defined by the microfibrils 1 and the knotted portions 2 and is substantially rectangular in cross section.
Figure 6:
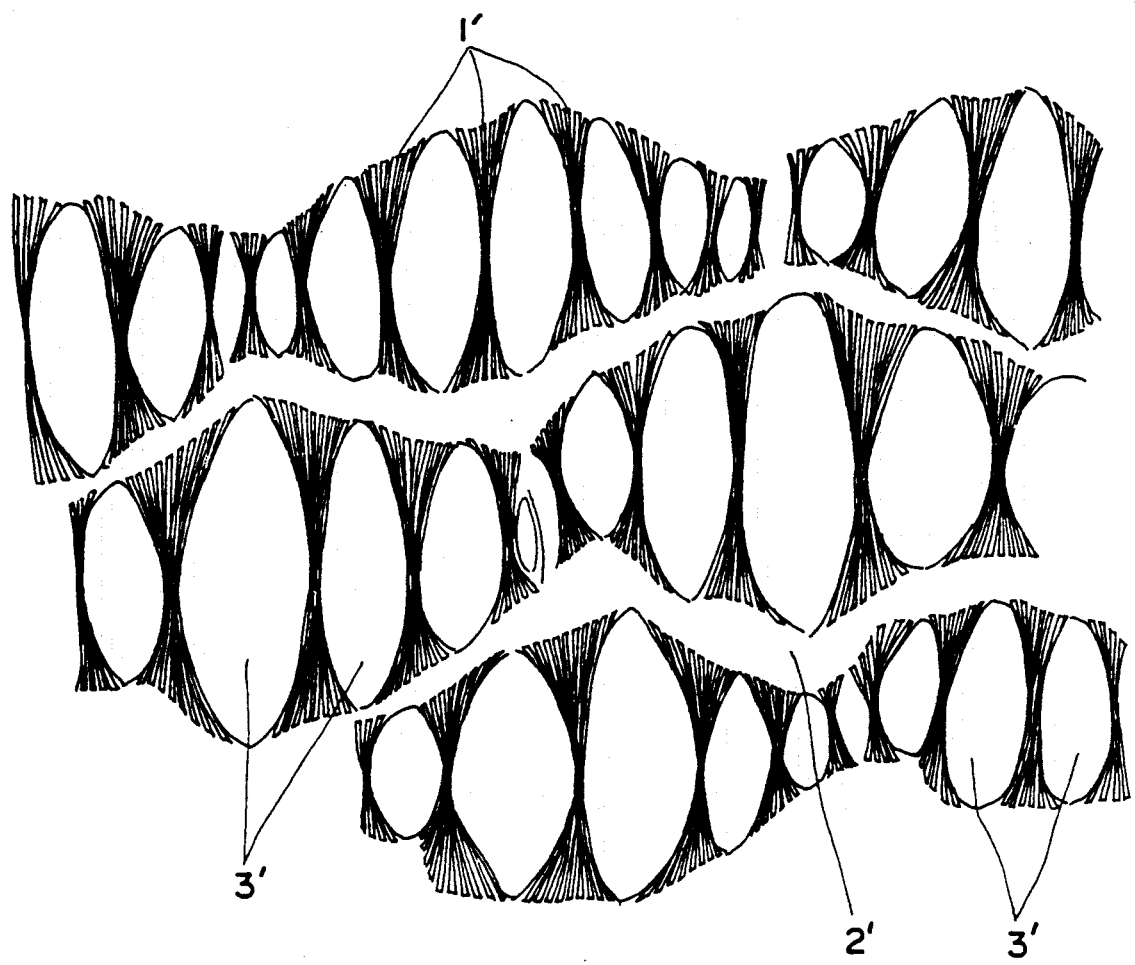
FIG. 6 is a schematic illustration of the photomicrographs of FIGS. 1 and 2 in which numeral 1' denotes a microfibril bundle comprising a plurality of microfibrils bonded together by means of a copolymer, numeral 2' denotes a coated knotted portion and numeral 3' denotes a pore which is defined by the microfibril bundles 1' and the coated knotted portions 2' and is substantially elliptic in cross section.

With respect to the porous polymeric membranes manufactured according to the customary stretching perforation method, a vast plurality of microfibrils each having an extremely small diameter are oriented along the stretching direction of the membrane and are arranged in parallel with one another, thereby forming substantially rectangular slits as shown in FIGS. 3 to 5. By contrast, with respect to the hydrophilic composite porous membrane of the present invention, a plurality of microfibrils are bonded together by means of a water-insoluble copolymer comprised of hydrophilic monomeric units and hydrophobic monomeric units, thereby forming a bundle of microfibrils having a columnar configuration with its diameter increased toward both end portions thereof from the middle portion thereof as shown in FIGS. 1, 2 and 6. On the other hand, each of the knotted portions has a stacked structure of lamellae coated with the above-mentioned copolymer. In the hydrophilic composite porous membrane of the present invention, the pores and openings defined by the microfibril bundles and the knotted portions each having a stacked structure of lamellae are not rectangular but substantially elliptic in the cross section taken along the same direction as the longitudinal direction of the microfibril bundles and as viewed against the surface of the membrane, respectively. The elliptic pores and openings each have a major axis whose length is substantially equal to that of the longitudinal side of the rectangular slits of the membrane manufactured simply according to the customary stretching perforation method and a minor axis whose length is several times that of the lateral side of the above-mentioned rectangular slits. Permeation of particles through a pore or slit is generally controlled by its size. In particular, the particle permeation is controlled by the smaller side when the membrane has a rectangular slit. On the other hand, it is controlled by the minor axis when the membrane has an elliptic pore. Since the lengths of the minor axes of the elliptic pores and openings of the membrane according to the present invention are several times that of the smaller side of the rectangular slits of the membrane prepared simply according to the stretching perforation method, a remarkable improvement in permeability for high molecular weight components is attained by the membrane of the present invention.

Moreover, as opposed to the angular corner portions of the rectangular slits of the membranous matrix manufactured simply by the stretching perforation method, the corner portions of the above-defined openings and pores of the composite porous membrane of the present invention are rounded due to the copolymer coated thereon. This is advantageous from the viewpoint of avoiding cell lesion when the membrane is utilized for blood treatment.

Figure 7:
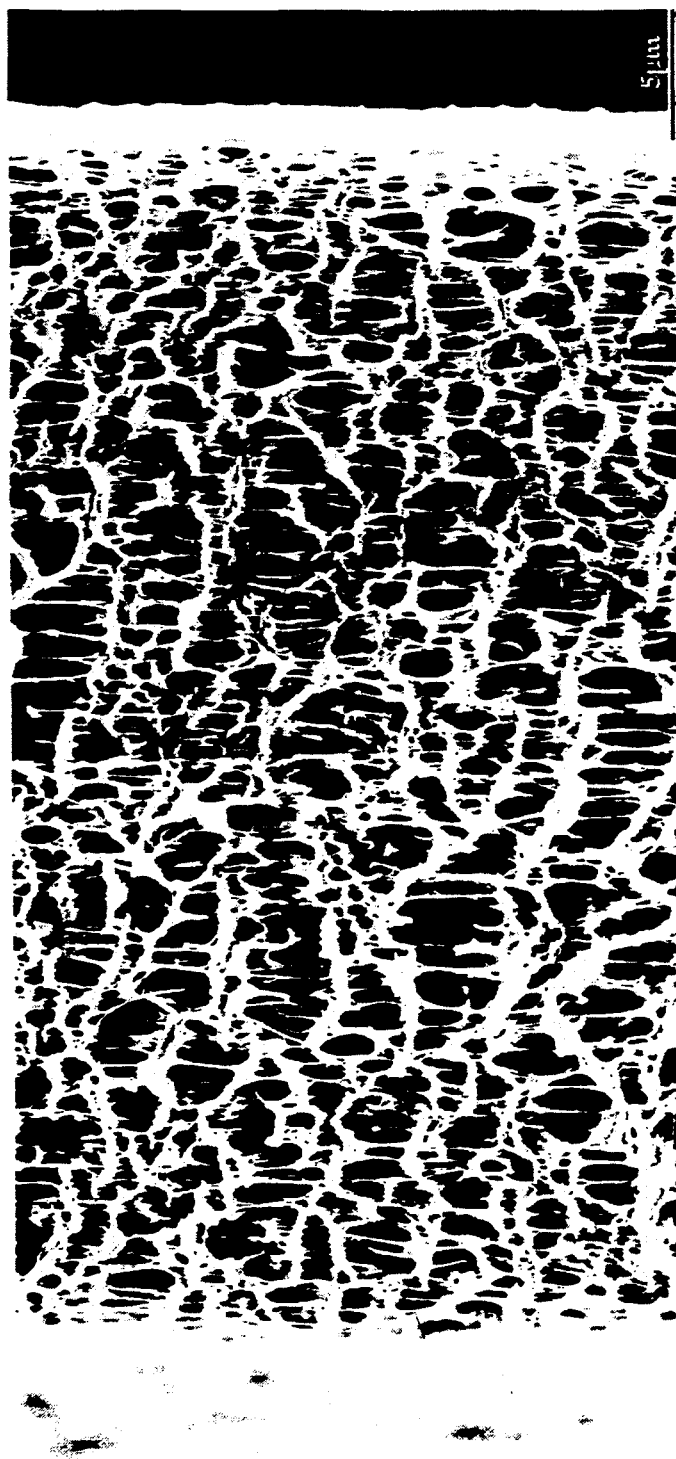
FIG. 7 is a scanning electron photomicrograph ($\times 3600$ in magnification) of a portion of a longitudinal cross section, taken along the direction of the hollow fiber axis, of the wall of the hydrophilic composite porous membrane in the form of a hollow fiber according to the present invention as prepared in Example 8 which will be presented later.

As shown in FIG. 7, a highly uniform cellular structure composed of the microfibril bundles and the knotted portions each having a stacked structure of lamellae is extended in the direction of the membrane wall thickness as well as in the longitudinal direction of the microfibril bundles in the membrane of the present invention. This uniform cell structure ensures an excellent permeability and an excellent mechanical strength.

The hydrophilic composite porous membrane of the present invention exhibits an excellent permeability for substances without the necessity of excessively increasing the stretching ratio and/or porosity of the membrane. With respect to the membrane of the present invention, the lengths of the major axes of the elliptic openings can be decreased to a desirable extent without adversely affecting the permeability of the membrane. This is advantageous from the viewpoint of preventing hemolysis at the time of blood filtration or the like.

To ensure the excellent permeability of the hydrophilic composite porous membrane according to the present invention, it is preferred that with respect to the microfibril bundles, the average interval $\bar{d}bi$ ($\mu$m) at one surface portion of the membrane, the average interval $\bar{d}bo$ ($\mu$m) at the other surface portion of the membrane and the average interval $\bar{d}bc$ ($\mu$m) at the central portion of the membrane in the direction of the thickness of the membrane satisfy the inequalities:

$$0.8 \leq \bar{d}bc/\bar{d}bi \leq 1.2,$$

$$0.8 \leq \bar{d}bc/\bar{d}bo \leq 1.2.$$

The method of measuring $\bar{d}bi$, $\bar{d}bo$ and $\bar{d}bc$ will be described later.

Also to ensure the excellent permeability of the hydrophilic composite porous membrane according to the present invention, it is preferred that the average interval $\bar{l}s$ ($\mu$m) between the knotted portions and the average interval $\bar{d}b$ ($\mu$m) between the microfibril bundles satisfy the inequalities:

$$0.2 \leq \bar{l}s \leq 5,$$

$$0.1 \leq \bar{d}b \leq 3,$$

-continued $$0.1 \leq \bar{l}s/\bar{d}b \leq 5.$$

The method of measuring $\bar{l}s$ and $\bar{d}b$ will be described later.

The maximum diameter of the throughpaths running between both the surfaces of the membrane can be determined according to the bubble point method indicated in ASTM-F316-70. The maximum diameter of the throughpaths of the hydrophilic composite porous membranes according to the present invention may be varied according to the use. It is preferably in the range of from about 0.1 to about 1.0 μm for the purpose of plasma separation. These hydrophilic composite porous membranes exhibit a water permeability as high as 1 to 30 l/hr.m².mmHg.

The terminology "overall surface" as used herein means the sum of the surfaces of the microfibril bundles and knotted portions. The composite porous membrane of the present invention is utterly different from the asymmetrical composite membrane known in the art. That is, with respect to the former, substantially the overall surface as mentioned above is covered by a copolymer coat, whereas with respect to the latter, the surface of only one side of the support membrane matrix is covered by a very thin, dense film, for example, a film having a thickness of 10 to 30 nm. Moreover, the former is imparted with microfiltration ability, whereas the latter is imparted with reverse osmosis ability, gas separation ability, etc.

The composite porous membrane of the present invention may be of a flat form, tubular form or hollow fiber form. Of these forms, the hollow fiber form is preferred because with it, a small-sized and efficient device, for example plasma separator, can be easily produced. The composite porous membrane of the present invention preferably has an average pore diameter of 0.02 to 1.0 μm and a porosity of 30 to 90 % by volume. The average pore diameter and porosity are measured in the manners as described later.

As the polyolefin to be employed in the present invention, there may be mentioned, for example, polyethylene, polypropylene, poly-3-methylbutene-1, poly-4-methylpentene-1 and copolymers prepared from two or more types of the monomers constituting the above-mentioned polyolefins. Of these polyolefins, polyethylene and polypropylene are preferably employed because a porous structure having a sufficiently large pore diameter can be easily obtained with them.

With respect to the molecular size of the polyolefin to be employed in the present invention, the polyolefin preferably exhibits a melt index of 50 or less, more preferably from 1 to 15, as measured according to ASTM D 1238.

The copolymer comprising hydrophilic monomeric units and hydrophobic monomeric units to be employed in the present invention may be any one of copolymers comprising hydrophilic monomeric units and hydrophobic monomeric units. In other words, the copolymer may be of any kind, for example, a block copolymer, a graft copolymer or a random copolymer provided that the copolymer comprises hydrophilic monomeric units and hydrophobic monomeric units.

The terminology "hydrophilic monomeric unit" as used herein means such a monomeric unit as will give a polymer which, when it is composed of only the monomeric units, is water-soluble or has wettability to water. As the preferred hydrophilic monomeric unit, there may be mentioned, for example, those from monomer compounds having a hydrophilic functional group such as a hydroxyl group, a carboxyl group, an amide group, an amino group, a sulfonic group, an oxyethylene group or the like. Specific examples of such monomeric units include those from vinyl alcohol, hydroxyethyl methacrylate, acrylic acid, acrylamide, vinylpyrrolidone, oxyethylene and the like.

The terminology "hydrophobic monomeric unit" as used herein means such a monomeric unit as will give a polymer which, when it is composed of only the monomeric units, cannot be wetted with water and of which the contact angle against distilled water on the polymer is about 70° or more. As the preferred hydrophobic monomeric unit, there may be mentioned, for example, those from monomer compounds having a hydrophobic functional group such as an alkyl group, an alkylene group, a halogen group, a phenyl group, a dimethylsiloxane group or the like. Specific examples of such monomeric units include those from ethylene, propylene, vinylidene fluoride, tetrafluoroethylene, vinyl chloride, vinylidene chloride, styrene, dimethysiloxane, ethylene terephthalate, bisphenol A carbonate, aminoundecanoic acid, aromatic urethanes and the like.

The hydrophilic monomeric unit content of the copolymer to be employed in the present invention is preferably in the range of 40 to 90 % by weight, more preferably 50 to 80 % by weight, based on the copolymer. When the hydrophilic monomeric unit content is less than 40 % by weight, the hydrophilic property of the copolymer is insufficient. On the other hand, when the hydrophilic monomeric unit content is more than 90 % by weight, the adhesion strength between the porous matrix made of a hydrophobic polymer and the coat made of the copolymer becomes poor. Among the above-mentioned hydrophobic monomeric units, ethylene units are most preferred. The copolymer comprising ethylene units exhibits a good adhesion to a polyolefin membranous matrix, especially when the membrane matrix is made of polyethylene. Moreover, since ethylene units are chemically stable, the membrane containing ethylene units as the hydrophobic monomeric units can be advantageously utilized as the safe material for medical instruments. As the hydrophilic monomeric units, vinyl alcohol units are most preferred. Vinyl alcohol units have the simplest chemical structure among the vinyl monomer units having a hydroxyl group. Vinyl alcohol units are chemically stable and are not hazardous to a living body. Further, vinyl alcohol units have a strong hydrophilicity and therefore, even if the vinyl alcohol unit content of the copolymer is relatively small, the copolymer exhibits a sufficient hydrophilicity. Usually, vinyl alcohol units are obtained by saponifying vinyl acetate units. It is preferred that the degree of saponification be 80 % or more in order to impart a sufficient hydrophilicity to the copolymer.

As the most preferred copolymer comprising hydrophilic monomeric units and hydrophobic monomeric units, there may be mentioned, for example, an ethylene-vinyl alcohol copolymer. With respect to the ethylene-vinyl alcohol copolymer, it s preferred that the copolymer contain 25 to 50 % by mole of ethylene units (60 to 83 % by weight of vinyl alcohol units). The copolymer having such composition is preferred from the viewpoint of the balance between adhesion and hydrophilicity. The ethylene-vinyl alcohol copolymer has the advantages as described above with respect to ethylene units and vinyl alcohol units.

The copolymer to be employed in the present invention is solid at room temperature (25° C.) and insoluble in water. The copolymer preferably has a number average molecular weight of 10,000 or more as measured according to the customary gel permeation chromatography method in which polystyrene is used as reference material.

Membranes of a polyolefin generally do not exhibit any appreciable water permeability. This is due to the hydrophobicity of the polymer. The polyolefin membranes come to allow water to permeate therethrough once the slits of the membrane are wetted with an alcohol. The composite membrane of the present invention having a copolymer coat formed substantially on the overall surface of the microfibril bundles and knotted portions exhibits an excellent permeability, which is generally about 50 % greater than the permeability exhibited by the polyolefin membranes pretreated with an alcohol. Hence, the formation of the copolymer coat on the overall surface of the microfibril bundles and knotted portions can be readily confirmed by comparing the water permeability of a composite porous membrane with that exhibited by the polyolefin membrane which has been wetted with an alcohol.

Moreover, the formation of the copolymer coat substantially on the overall surface of the microfibril bundles and knotted portions can be confirmed by the microscopic observation of the cross section of a dyed coat. The dyed coat can be obtained by adding a dye, for example methylene blue, to the copolymer solution to be applied to the polyolefin membranous matrix.

The copolymer coat enables the composite porous membrane to exhibit a desirable permeability without dissolving in water, aqueous solutions or suspensions or the like.

The coat of the composite porous membrane of the present invention covers substantially the overall surface of the microfibril bundles and knotted portions. It is generally preferred that to ensure the sufficient water permeability of the membrane, the coat cover at least 70 % of the area of the overall surface. The thickness of the coat is preferably at least 1 nm (corresponding to the thickness of a monomolecular layer). The thickness of the coat can be increased as far as pores are left within the membrane and openings are left on both the surfaces of the membrane, which openings respectively communicate with the pores. The amount of the coat as expressed in terms of weight per unit area of the surface of the porous matrix is preferably in the range of from about $1 \times 10^{-3}$ to about $2 \times 10$ g/m². The overall surface of the microfibril bundles and knotted portions is measured according to the method as described later.

The method of producing the hydrophilic composite porous membrane according to the present invention is not critical. However, the membrane may be preferably produced by the following method.

In another aspect of the present invention, there is provided a method of producing a hydrophilic composite porous membrane comprising the steps of:

(1) applying, to an oriented polyolefin membranous matrix comprising a plurality of microfibrils oriented in the same direction as that of the orientation of the matrix and a plurality of knotted portions cross-connected to the microfibrils, the matrix having slits defined by the microfibrils and the knotted portions which slits are present in communicating relationship and form throughpaths running from one surface of the matrix to the other surface of the matrix, a solution of a water-insoluble copolymer comprised of hydrophilic monomeric units and hydrophobic monomeric units and having a hydrophilic monomeric unit content of from 40 to 90 % by weight based on the weight of the copolymer in an organic solvent or a mixture of an organic solvent and water thereby to obtain an intermediate product in which the solution is attached to substantially the overall surface of the matrix, the overall surface including the surfaces of the microfibrils and the knotted portions and both surfaces of the matrix; and (2) drying the intermediate product to remove the organic solvent or mixture of an organic solvent and water so that the copolymer forms a coat covering substantially the overall surface of the matrix to form a coated matrix, forming pores within the coated matrix which are present in communicating relationship and forming openings on both surfaces of the coated matrix, the openings communicating with the pores to form throughpaths running from one surface of the coated matrix to the other surface of the coated matrix.

The oriented polyolefin membranous matrix having slits to be employed in the present invention is manufactured from a hydrophobic crystalline polymer according to the customary stretching perforation method as described hereinbefore.

The organic solvent to be employed in the present invention for dissolving the copolymer comprising hydrophilic monomeric units and hydrophobic monomeric units is chosen from the ordinarily employed good solvents for high polymers. It is generally preferred that a polar organic solvent be used. When a solution made by dissolving a hydrophilic copolymer in an organic solvent having a high polarity is applied onto the surface of a hydrophobic polyolefin matrix to form a coat, the hydrophilic groups of high polarity appear on the surface of the coat, thereby rendering the surface advantageously hydrophilic. Water may be preferably added to the organic solvent for a hydrophilic copolymer in order to increase the polarity of the solvent as far as the solubility of the copolymer in the solvent is not decreased. The suitable organic solvent may be one which exhibits a solubility in water of 20 % by weight or more at a temperature lower than the boiling point of the solvent and which has a Hildebrand solubility parameter of 9.5 $(cal.cm^{-3})^{\frac{1}{2}}$ or more. As the organic solvent to be employed in the present invention, there may be mentioned, for example, alcohols such as methanol, ethanol, n-propanol, isopropanol, sec-butanol, t-butanol, cyclohexanol and the like; haloalcohols such as trifluoroethanol, hexafluoroisopropanol and the like; polyhydric alcohols such as ethylene glycol, propylene glycol, glycerin and the like; tetrahydrofuran; dioxane; dimethylformamide; dimethyl sulfoxide; dimethylacetamide; formamide; ethylene chlorohydrin and the like. Of these solvents, methanol, ethanol, 1-propanol, 2-propanol and dimethyl sulfoxide are most preferably used when ethylene-vinyl alcohol copolymer is employed for the coat because they are good solvents for the copolymer and their toxicity is low. The above-mentioned solvents may be used alone or in the form of a mixture thereof. A mixture of one or more of the above-mentioned organic solvents and water is preferably employed.

With respect to an ethylene-vinyl alcohol copolymer, a detailed explanation will be made on the method of producing a hydrophilic composite porous membrane according to the present invention. First, the copolymer is dissolved in a solvent as mentioned above according to customary procedures to obtain a solution. The copolymer concentration of the solution may be any concentration suitable for coating. However, it is generally in the range of from about 0.1 to about 5% by weight, preferably from about 0.5 to about 2% by weight. An extremely low copolymer concentration such as that lower than about 0.1% by weight may be undesirable because of the difficulty in attaining satisfactory bonding of the microfibrils of the matrix. On the other hand, an extremely high copolymer concentration such as that greater than about 5% by weight may be undesirable because of the difficulty in causing the copolymer solution to penetrate into the slits of the matrix. The copolymer may be dissolved at a temperature which is not critical but preferably at a temperature of about 25° C. to about the boiling point of the solvent.

Next, the copolymer solution is applied to a polyolefin membranous matrix as described hereinbefore to obtain an intermediate product in which the solution is attached to substantially the overall surface of the matrix. Then, the intermediate product is dried to remove the solvent. As a result of the removal of the solvent, a coat of the copolymer is formed on substantially the overall surface of the matrix. However, pores are left within the matrix and openings which respectively communicate with the pores are left on both the surfaces of the matrix. The above-mentioned application of the copolymer solution and drying of the intermediate product may be carried out batchwise or in a continuous manner.

When the application of the copolymer solution and drying are conducted batchwise, the polyolefin membranous matrix is cut into a predetermined length in the case of a hollow fiber or tubular matrix or into a predetermined shape, for example circular shape or rectangular shape, in the case of a flat matrix. On the other hand, when the application of the copolymer solution and drying are conducted in a continuous manner, a continuous form of flat, tubular or hollow fiber polyolefin membranous matrix is allowed to travel in the longitudinal direction of the matrix. Conducting the application of the copolymer solution and drying in a continuous manner is more advantageous than conducting them batchwise from the viewpoint of productivity.

The coat may be formed by one application of the copolymer solution followed by drying. Alternatively, the coat may be formed by repeating the sequence of application of the copolymer solution at a relatively low concentration, for example about 0.1 to 2% by weight and drying. When the copolymer solution has a high concentration of copolymer and hence a high viscosity, the formation of a uniform coat on the overall surface of the matrix becomes difficult due to the occurrence of uneven coating of the solution and difficulty in penetration of the solution into the slits of the matrix. Therefore, repeating the sequence of application of the copolymer solution at a relatively low concentration, for example about 0.1 to 2% by weight and drying is generally more advantageous than conducting only one application of the copolymer solution followed by drying.

With respect to the application of the copolymer solution, the method of effecting the application is not critical. Application of the copolymer solution may be performed, for example, by coating the matrix with the copolymer solution being fed from a nozzle disposed around the matrix or by dipping the matrix in the copolymer solution. Further, application of the copolymer solution may be performed by spraying the solution over the matrix or by allowing the matrix to travel on a roller having a copolymer solution layer thereon. When, for the application of the copolymer solution, a bundle of matrix pieces is dipped in a copolymer solution and is then taken out from the solution, an excess of the solution may be retained between the matrix pieces. The excess solution can be readily removed by, for example, giving vibration to the bundle.

The temperature at which the copolymer solution is applied to the polyolefin membranous matrix is not critical. However, it is generally preferred that the copolymer solution be applied at about 25° C. to a temperature which is lower than the boiling point of the solvent. In the case of the preferred solvent comprising an organic solvent and water, the copolymer solution may be applied at a temperature of about 25° C. to less than 100° C. Generally, with the elevation of the temperature, the viscosity of the copolymer solution decreases. The decrease of the viscosity is advantageous from the viewpoint of ease in the penetration of the copolymer solution into the porous matrix. However, at temperatures equal to or greater than the boiling point of the solvent, the evaporation of the solvent from the copolymer solution is so high that the composition of the solution is disadvantageously changed. Application of the copolymer solution may be conducted within a period of a second to several tens of minutes. When the polyolefin membranous matrix is of flat form, the copolymer solution may be applied either to one side or both sides of the matrix. When the matrix is of tubular or hollow fiber form, the copolymer solution is preferably applied to only the outer surface of the matrix. Even if the copolymer solution is applied to one side of the matrix, since the matrix has a porous structure, part of the copolymer solution on the applied surface permeates into the pores of the matrix to reach the other surface of the matrix, thereby adhering to the overall surface of the matrix.

The period of time taken for the applied copolymer solution to permeate the slits of the matrix thereby coating substantially the overall surface of the matrix depends on the kind of the matrix and the kind of the copolymer solution. However, it is generally in the range of about 1 sec to about 1 hr. The amount of the copolymer attached to the overall surface of the matrix is preferably in the range of from about 1 to about 30% by weight, more preferably from about 5 to about 20% by weight based on the amount of the polyolefin matrix.

In the composite membrane according to the present invention, the adhesion between the coat and the polyolefin matrix is excellent, and the surface of the coat has advantageously a high hydrophilicity. This is believed to be due to the unique disposition of the ethylene units and vinyl alcohol units of the copolymer. The ethylene units are nonpolar, and have a hydrophobic property as the polyolefin matrix has. On the other hand, the vinyl alcohol units are polar, and have a hydrophilic property as opposed to the polyolefin matrix. Accordingly, when the copolymer solution is applied to the polyolefin matrix in the method of the present invention, it is believed that the ethylene units in the copolymer are biased toward the polyolefin matrix, whereas the vinyl alcohol units in the copolymer are biased toward the surface of the coat remote from the polyolefin matrix. From the viewpoint of promoting the above-mentioned unique disposition, a mixed solvent of an organic solvent and water may be preferred to an organic solvent alone. Water may be added to an organic solvent as much as the copolymer can be dissolved in the mixed solvent. To increase the polarity of the mixed solvent thereby increasing the above-mentioned disposition effect, it is preferred that the amount of water be increased. The solubility of the copolymer in the mixed solvent varies depending on the ethylene unit content of the copolymer, the temperature of the solvent and other factors. In general, the amount of water is preferred to be in the range of 5 to 60% by weight based on the mixed solvent.

With respect to the drying of the intermediate product, the drying may be effected according to customary drying methods, for example, vacuum drying, hot-air drying or the like. The drying may be effected at a temperature which will not cause deformation of the porous matrix coated with the copolymer solution. It is generally preferred that the temperature be not greater than 130° C. Under this temperature, a higher drying temperature is preferred to attain a diameter increase for the throughpaths running between both the surfaces of the matrix. With the increase of the temperature, the $\bar{d}_b$ tends to increase and the $\bar{l}_s$ tends to decrease while shrinkage of the matrix occurs in its orientation direction.

During the drying of the intermediate product, there occur changes in structure, namely, formation of microfibril bundles, formation of substantially elliptic pores and openings, and decrease of $\bar{l}_s/\bar{d}_s$. Rapid drying of the intermediate product is not desirable because it adversely affects the occurrence of these structural changes. Accordingly, it is preferred that the intermediate product be dried slowly, and hence the drying time is generally not less than 1 min, preferably not less than 10 min.

After completion of the removal of the copolymer solvent from the intermediate product, heating may be continued to promote the above-mentioned structural changes, at an arbitrary temperature which is however not greater than the melting temperature of the polyolefin membranous matrix.

The hydrophilic composite porous membrane of the present invention has excellent mechanical strengths in the wet state as well as in the dry state, and is readily wettable with water. The hydrophilic composite porous membrane of the present invention exhibits an improved permeability for high molecular weight components and is excellent in safety. Therefore, an advantageous utilization of the hydrophilic composite porous membrane of the present invention is found in plasma separation.

Accordingly, in a further aspect of the present invention, there is provided a plasma separator comprising:
a vessel provided with a blood introduction means, a blood withdrawal means and a plasma withdrawal means; and
a plurality of porous hollow fibers which are contained within the vessel;
the blood introduction means and the blood withdrawal means communicating with each other through the plurality of porous hollow fibers fluidtightly connected therebetween;
the hollow fiber being adapted to pass blood therethrough while causing the plasma component of the blood to be selectively passed through the walls of the hollow fibers and withdrawn through the plasma withdrawal means;
each hollow fiber comprising:
microfibril bundles,
knotted portions cross-connected to the microfibril bundles, and each having a stacked structure of lamellae, and
a copolymer coat formed substantially on the overall surface of the microfibril bundles and the knotted portions,
each microfibril bundle comprising a plurality of microfibrils bonded together by means of the copolymer,
the microfibril bundles having thereon the copolymer coat cooperating with the knotted portions having thereon the copolymer coat to form a membranous structure having pores therewithin and openings on both surfaces thereof, the pores and the openings forming throughpaths running between both the surfaces of the membranous structure,
the pores being substantially elliptic in the cross section taken along the same direction as the longitudinal direction of the microfibril bundles,
the openings being substantially elliptic as viewed against the surface of the membranous structure,
the microfibrils and the knotted portions being comprised of a polyolefin,
the copolymer being water-insoluble and being comprised of hydrophilic monomeric units and hydrophobic monomeric units, and having a hydrophilic monomeric unit content of from 40 to 90% by weight based on the weight of the copolymer.

The kind of the vessel to be employed in the present invention is not critical, and the vessel may be made of, for example, a material selected from various plastics such as polycarbonate, a copolymer of acrylonitrile and styrene, polystyrene and a terpolymer of acrylonitrile, butadiene and styrene. The vessel, which is provided with a blood introduction means, a blood withdrawal means and a plasma withdrawal means, is well known in the art and can be fabricated according to customary procedures.

DETAILED DESCRIPTION OF THE PREFERRED EMBODIMENTS

The present invention will now be described in more detail with reference to the following Examples, which should not be construed to be limiting the scope of the present invention.

In the following Examples and Comparative Examples, the properties of the polyolefin membranous matrix and hydrophilic composite porous membrane were determined according to the following methods.

(1) Average Pore Diameter ($\mu$m)

The average pore diameter was determined as follows. The pore diameter and pore volume of the membrane are measured by means of a mercury porosimeter. The logarithm of the diameter is plotted as abscissa and the pore volume is plotted as ordinate to give a pore diameter distribution curve. Thus, the total pore volume is defined by the abscissa and the pore diameter distribution curve. A vertical line can be drawn in parallel to the ordinate so that the total pore volume is halved. The value of the pore diameter on the abscissa at its point crossed by the above-mentioned vertical line is referred to as "average pore diameter".

(2) Maximum Pore Diameter according to Bubble Point Method

In accordance with ASTM-F316-70, air pressure is applied to the inner surface of a porous hollow fiber membrane which has been immersed in ethanol. The air pressure is increased until a bubble is observed. The maximum pore diameter according to the bubble point method is calculated from the pressure at which a bubble is first observed.

(3) Water Permeability (l/hr.m$^2$.mmHg)

The water permeability of the membrane was determined as follows. The membrane is immersed in distilled water at 25° C. and at a trans-membrane differential pressure of 50 mmHg without any pretreatment for rendering the sample hydrophilic using ethanol, and the amount of the water which has passed through the membrane is measured. The water permeability of the membrane is calculated from the amount of the water.

(4) Tensile Breaking Strength (Kgf/cm$^2$) and Tensile Breaking Elongation (%)

The tensile breaking strength and tensile breaking elongation were determined as follows. The membrane is subjected to a tensile test using an Instron type tensile tester at a strain rate of 200%/min and at a temperature of 25° C. to obtain five measurement values. The values are averaged to determine the tensile breaking strength and tensile breaking elongation.

(5) Overall Surface of Porous Matrix (m$^2$/g)

The overall surface of porous matrix was determined as follows. The nitrogen gas adsorption amount of the matrix is measured using a BET (S. Brunauer—P. H. Emmett—E. Taylor) type surface area measuring apparatus, and the overall surface is determined from the nitrogen gas adsorption amount according to the customary one-point method.

(6) Porosity (% by volume)

The porosity as used herein is defined as follows.

$$\text{Porosity (\%)} = \frac{\text{pore volume}}{\text{bulk volume of the membrane}} \times 100$$

The pore volume is measured using a mercury porosimeter. The bulk volume of the membrane is determined by making a 100-fold magnified image of the sample membrane by means of a projector and measuring the dimension of the sample, on the magnified image, by means of a micrometer.

(7) Plasma Separation Rate (ml/hr.m$^2$.mmHg)

An ACD solution (citric acid—sodium citrate—dextrose solution)-added bovine blood having a hematocrit value of 35% is passed through the composite porous membrane at 37° C. and at a transmembrane differential pressure of 30 mmHg. By measuring the volume of the separated plasma, the plasma separation rate is determined.

(8) Hot Water Extraction Test

The composite porous membrane is immersed in hot water maintained at 80±5° C. for 3 hours. The weight change of the membrane is obtained by measuring the weight of the membrane before and after the immersion.

(9) Polymer Latex Permeability

The standard particles employed are (a) colloidal silica having an average particle diameter of 0.08 μm [Cataloid (registered trade mark) S180P manufactured and sold by Shokubai Kasei Kogyo K. K., Japan], (b) poly(styrene-co-butadiene) latex having an average particle diameter of 0.20 μm [SBR636 manufactured and sold by Dow Chemical Co., U.S.A.]and (c) polystyrene latex having an average particle diameter of 0.33 μm [Uniform Latex (registered trade mark) manufactured and sold by Dow Chemical Co., U.S.A.]. The obtained suspension is filtered through the composite porous membrane at a transmembrane differential pressure of 50 mmHg. Then, the obtained filtrate is subjected to nephelometry at a wave length of 500 nm to determine the concentration of the polymer particles. From the determined concentration, there is calculated the permeability (Sc) for the polymer particles according to the equation:

$$Sc(\%) = Cf/Co \times 100$$

wherein Cf represents the concentration of the polymer particles in the filtrate and Co the concentration of those in the suspension before filtration.

(10) Average Interval ($\bar{l}s$) between Knotted Portions and Average Interval ($\bar{d}b$) between Microfibril Bundles A porous membrane specimen is immersed in an acrylic monomer (6:4 mixture of methyl methacrylate and butyl methacrylate) containing a radical initiator, thereby causing the monomer to penetrate into the pores of the membrane specimen. The specimen is exposed to heat to effect thermal polymerization of the monomer, thereby converting the monomer to a polymer. The resulting specimen is frozen with dry ice and sliced along the orientation direction of the membrane by the use of a high-precision microtome, thereby obtaining a specimen for electron microscopic observation having an extremely small thickness such as about 100 nanometers. The acrylic polymer is dissolved out with a solvent (chloroform), and evaporation of carbon is effected onto the surface of the pores of the specimen in accordance with the customary evaporation technique. A transmission electron photomicrograph of ×2600 in magnification is taken and enlarged to obtain a photomicrograph of ×6500 in magnification shown in FIG. 8 with respect to the specimen having carbon evaporated onto the surface of the pores thereof, and the electron photomicrograph is subjected to image analysis using a TAS PLUS image analyzer manufactured and sold by Leitz A. G., West Germany. In the image analysis, a binary image (dark image) of the knotted portions is taken and the $\bar{l}s$ is measured at a measurement unit of 0.067 μm. Then, a binary image (half tone image) of the microfibrils is taken and the $\bar{d}b$ is measured at a measurement unit of 0.047 μm.

EXAMPLE 1

A high-density polyethylene [HI-ZEX 2208J (registered trade mark) manufactured and sold by Mitsui Petrochemical Co., Japan] having a density of 0.968 g/cm$^3$ and a melt index, as measured in accordance with ASTM D1238, of 5.5 was extruded through an annular hollow fiber spinning nozzle having an annular orifice outside diameter of 33 mm and an annular orifice inside diameter of 27 mm (slit width: 3 mm) at a spinning temperature of 150° C. and a spinning rate of 400 m/min. The thus obtained preliminary hollow fiber was subjected to annealing at 120° C. for 2 hours, thereby obtaining a hollow fiber having an inner diameter of 350 μm and a thickness of 50 μm. The annealed hollow fiber was then cold stretched at a stretching ratio of 30% based on the length of the fiber before stretching at room temperature (about 25° C.), and hot stretched at a stretching ratio of 350% based on the length of the fiber before stretching at 105° C.. Thus, there was obtained a polyethylene hollow fiber matrix having a porous structure. The obtained hollow fiber matrix had an inner diameter of 320 μm, a thickness of 45 μm and an overall surface area, as defined hereinbefore, of 21 m²/g. The water permeability of the obtained matrix pretreated with ethanol was 4.1 l/hr.m².mmHg. An ethylene-vinyl alcohol copolymer [Soarnol E (registered trade mark) manufactured and sold by Nippon Synthetic Chemical Industry Co., Ltd., Japan) having an ethylene unit content of 38% by mole and a vinyl alcohol unit content of 72% by weight was dissolved in a 75% by volume aqueous ethanol solution at an elevated temperature to obtain a solution containing the copolymer at a concentration of 0.5% by weight. While maintaining the copolymer solution at a temperature of 50° C., the above-obtained polyethylene hollow fiber matrix was dipped in the copolymer solution for 10 minutes. The matrix was taken out and dried by means of hot air having a temperature of 50° C. for 3 hours to obtain a composite hollow fiber membrane according to the present invention.

The thus-obtained composite hollow fiber membrane had an inner diameter of 320 μm, a thickness of 45 μm, a porosity of 71% by volume, and an average pore diameter of 0.70 μm as measured with a mercury porosimeter. The amount of the coat was $3.2 \times 10^{-3}$ g/m². The obtained membrane had a good water wettability and when the membrane was immersed in water, it was readily wetted with water. Further, without any pretreatment, the obtained membrane showed an excellent water permeability, which was 7.9 l/hr.m².mmHg. Since the water permeability of the membrane which was pretreated with ethanol was also about 7.9 l/hr.m².mmHg, it was confirmed that substantially the overall surface of the matrix was covered by the copolymer coat. The plasma separation rate of the membrane was also as high as 85 ml/hr.m².mmHg. The membrane was subjected to the hot water extraction test. As a result, the extracted proportion was found to be 0.0%, which was desirable as compared with the average extracted proportion of 0.4% and maximum extracted proportion of 1.6% as indicated in Example 3 of Japanese Patent Application Laid-open Specification No. 54-8669/1979. The tensile breaking strength and tensile breaking elongation of the membrane in the dry state were found to be 510 kgf/cm² and 30%, respectively. On the other hand, the tensile breaking strength and tensile breaking elongation of the membrane in the wet state were found to be 517 kgf/cm² and 31%, respectively. That is, the mechanical properties of the membrane in the wet state were hardly different from those in the dry state, and in both cases, the membrane had excellent mechanical properties. No swelling of the membrane in the lengthwise direction was observed in the wet state. Drying and wetting of the membrane were repeated 10 times, and the water permeability and mechanical properties thereof were measured. Any significant decrease of the water permeability and change of the mechanical characteristics of the membrane were not observed advantageously.

To further confirm the formation of the copolymer coat substantially on the overall surface of the matrix, the above procedures for producing a composite hollow fiber porous membrane were repeated except that methylene blue was added to the copolymer solution. The resulting hollow fiber membrane was transversely cut to obtain a thin piece, and the cross section of it was observed by means of an optical microscope (magnification: ×600). The microscopic observation of the cross section showed that a dyed coat was uniformly formed substantially on the overall surface of the matrix.

COMPARATIVE EXAMPLE 1

A polypropylene [Noblen D-501 (registered trade mark) manufactured and sold by Sumitomo Chemical Co., Ltd., Japan], finely divided silicic acid and dibutyl phthalate were mixed at a weight ratio of 23:23.5:53.5 in a Henschel mixer and pelletized. The pellets were extruded through an annular double spinning nozzle attached to the extruder to form a hollow fiber. The dibutyl phthalate in the hollow fiber was extracted with 1,1,1-trichloroethane and then, the finely divided silicic acid in the hollow fiber was extracted with a 40% NaOH aqueous solution, followed by washing with water and drying. Thus, there was obtained a porous polypropylene hollow fiber matrix having an inner diameter of 550 μm and a thickness of 160 μm. The water permeability of the obtained matrix which was pretreated with ethanol was 4.0 l/hr.m².mmHg.

A copolymer coat was formed on the overall surface of the polypropylene hollow fiber matrix in substantially the same manner as in Example 1. Thus, a composite porous hollow fiber membrane was obtained. The membrane had an average pore diameter of 0.25 μm. The membrane also had a water permeability of 4.0 l/hr.m².mmHg which was identical with that of the non-coated matrix pretreated with ethanol.

EXAMPLE 2 high-density polyethylene [HI-ZE×2208J (registered trade mark) manufactured and sold by Mitsui Petrochemical Co., Japan] having a density of 0.968 g/cm³ and a melt index, as measured in accordance with ASTM D1238, of 5.5 was extruded through an annular hollow fiber spinning nozzle having an annular orifice outside diameter of 33 mm and an annular orifice inside diameter of 27 mm (slit width: 3 mm) at a spinning temperature of 147° C. and a spinning rate of 200 m/min. The thus obtained preliminary hollow fiber was subjected to annealing at 115° C. for 2 hours, thereby obtaining a hollow fiber having an inner diameter of 390 μm and a thickness of 55 μm. The annealed hollow fiber was then subjected to the following sequence of treatments while allowing the hollow fiber to travel. There was obtained a hydrophilic composite porous membrane in the form of a hollow fiber.

| | |
|---|---|
| (1) Cold stretching: | temperature of 25° C., stretching ratio of 33% based on the length of the fiber before stretching, annealed hollow fiber feed speed of |

| | -continued | |
|---|---|---|
| (2) Hot stretching: | 1.5 m/min | |
| | 1st step | |
| | temperature of 96° C. in air, stretching ratio of 300% based on the length of the fiber before the 1st hot stretching | |
| | 2nd step | |
| | temperature of 113° C. in air, stretching ratio of 127% based on the length of the fiber before the 2nd hot stretching (total stretching ratio of 380% based on the length of the fiber before stretching) | |
| | 3rd step | |
| | temperature of 116° C. in air, stretching ratio of 113% based on the length of the fiber before the 3rd hot stretching (total stretching ratio of 430% based on the length of the fiber before stretching) | |
| (3) Heat set: | temperature of 115° C., period of 2 mins. | |

Thus there was obtained a polyethylene hollow fiber matrix having a porous structure. The obtained hollow fiber matrix had an inner diameter of 350 μm, a thickness of 50 μm and a porosity of 76% by volume. The water permeability of the obtained matrix which was pretreated with ethanol was 8.0 l/hr.m$^2$.mmHg.

Various coats were formed on the overall surface of the polyethylene hollow fiber matrix in substantially the same manner as in Example 1 except that various kinds of ethylene-vinyl alcohol copolymers having different ethylene unit contents and vinyl alcohol unit contents [Soarnol Z and E (registered trade mark) manufactured and sold by Nippon Synthetic Chemical Co., Ltd., Japan, Eval EP-F, EP-E and EP-G (registered trade mark) manufactured and sold by Kuraray Co., Ltd., Japan, and Soarlex DH (saponified) obtained by saponifying, to a saponification degree of more than 99%, Soarlex DH (registered trade mark) manufactured and sold by Nippon Synthetic Chemical Co., Ltd., Japan] as indicated in Table 1 were used to prepare the copolymer solution, and that the copolymer solutions were maintained at a temperature of 75° C. instead of 50° C. With respect to the saponified Soarlex DH, however, dimethyl sulfoxide was used as the solvent in place of ethanol. Thus, there were obtained composite porous hollow fiber membranes as indicated in Table 1. The obtained composite porous hollow fiber membranes each had a porosity of about 74% by volume and had high water permeabilities as indicated in Table 1.

TABLE 1

| | Ethylene-vinyl alcohol copolymer | | |
|---|---|---|---|
| No. | Kind of copolymer | Ethylene unit content (% by mole) | Vinyl alcohol unit content (% by weight) | Water permeability [l/hr · m$^2$ · mmHg] |
| 1 | Soarnol Z | 29 | 79 | 14.7 |
| 2 | Eval EP-F | 32 | 77 | 14.3 |
| 3 | Soarnol E | 38 | 72 | 14.1 |
| 4 | Eval EP-E | 44 | 67 | 13.3 |
| 5 | Eval EP-G | 47 | 64 | 13.7 |
| 6 | Soarlex DH (saponified) | 57 | 54 | 12.3 |

TABLE 1-continued

| | Ethylene-vinyl alcohol copolymer | | |
|---|---|---|---|
| No. | Kind of copolymer | Ethylene unit content (% by mole) | Vinyl alcohol unit content (% by weight) | Water permeability [l/hr · m$^2$ · mmHg] |
| | non-coated matrix | | | 8.0 |

COMPARATIVE EXAMPLE 2

A copolymer of ethylene and vinyl acetate having a vinyl acetate content of 55% by weight [Soarlex BH (registered trade mark) manufactured and sold by Nippon Synthetic Chemical Co., Ltd., Japan] and a copolymer of ethylene and vinyl acetate having a vinyl acetate content of 40% by weight [Elvax 40 (registered trade mark) manufactured and sold by E. I. Du Pont de Nemours and Company, U.S.A.] were separately dissolved in a 80:20 by volume mixture of benzene and methanol and saponified with KOH to obtain an ethylene-vinyl alcohol copolymer having a vinyl alcohol unit content of 38% by weight (outside the scope of the present invention) and an ethylene-vinyl alcohol copolymer having a vinyl alcohol unit content of 26% by weight (outside the scope of the present invention), respectively. The thus obtained copolymers were separately dissolved in a 60:40 by volume mixture of benzene and methanol at an elevated temperature to obtain 0.5% by weight copolymer solutions.

Substantially the same procedures as described in Example 1 were repeated except that the above solutions were used as the copolymer solution. The results are shown in Table 2. As is apparent from Table 2, the resulting composite porous membranes exhibit good water permeabilities only when the membranes have been pretreated with ethanol. That is, although the membranes have pores within the matrix and openings on both the surfaces of the matrix, through which pores and openings water is permeated, the water permeabilities of the membranes are poor without the pretreatment with ethanol.

TABLE 2

| | Water permeability (l/hr · m$^2$ · mmHg) | |
|---|---|---|
| Copolymer | without pretreatment with ethanol | after pretreatment with ethanol |
| Saponified Soarlex BH | 0.3 | 7.8 |
| Saponified Elvax 40 | 0.0 | 7.8 |

EXAMPLE 3

Two sheets of flat polyethylene membrane matrixes having a porous structure were prepared according to the known method described in Example 1 of Japanese Patent Application Laid-open Specification No. 57-117951/1982. An ethylene-vinyl alcohol copolymer [Eval EP-G (registered trade mark) manufactured and sold by Kuraray Co., Ltd., Japan] having an ethylene unit content of 47% by mole and a vinyl alcohol unit content of 64% by weight was dissolved in two kinds of solvents as indicated in Table 3, namely, dimethyl sulfoxide (DMSO) and a mixture consisting of 20% by volume of water and 80% by volume of DMSO, to form solutions each containing the copolymer at a concentration of 0.5% by weight. The polyethylene flat membranes were respectively impregnated with the thus obtained solutions at room temperature (20° C.), followed by drying. Thus, there were obtained two flat composite porous membranes having a thickness of 30 μm and an average pore diameter of 0.60 μm. The water permeabilities of the composite membranes were found to be advantageously high as shown in Table 3.

TABLE 3

| No. | Solvent for ethylene-vinyl alcohol copolymer | Water permeability of composite porous membrane (l/hr · m² · mmHg) |
|---|---|---|
| 1 | Dimethyl sulfoxide | 4.8 |
| 2 | 80% by volume aqueous dimethyl sulfoxide solution | 6.4 |

EXAMPLE 4

Polyethylene hollow fiber membranous matrixes were prepared in substantially the same manner as in Example 1. An ethylene-vinyl alcohol copolymer [Soarnol Z (registered trade mark) manufactured and sold by Nippon Synthetic Chemical Industry Co., Ltd., Japan] having an ethylene unit content of 29% by mole and a vinyl alcohol unit content of 79% by weight was dissolved in aqueous ethanol solutions having different ethanol concentrations as indicated in Table 4 so that various solutions containing the copolymer at a concentration of 0.5% by weight were prepared. The hollow fiber matrixes were separately passed through the copolymer solutions maintained at a temperature of 60° C. in a continuous manner so that the time during which the hollow fiber matrixes were retained in the solutions was 5 minutes. Thus, the hollow fiber matrixes were impregnated with the copolymer solutions so that the copolymer solutions covered substantially the overall surface of the hollow fiber matrixes. While causing the hollow fiber matrixes to continuously travel, hot air having a temperature of 55° C. was blown onto the hollow fiber matrixes to evaporate the solvent completely. Thus there were obtained composite hollow fiber porous membranes in the dry state. The composite porous membranes each had a high water permeability as shown in Table 4.

TABLE 4

| No. | Solvent for ethylene-vinyl alcohol copolymer | Water permeability of composite porous membrane (l/hr · m² · mmHg) |
|---|---|---|
| 1 | 50% by volume aqueous ethanol solution | 6.2 |
| 2 | 60% by volume aqueous ethanol solution | 7.9 |
| 3 | 75% by volume aqueous ethanol solution | 7.5 |
| 4 | 80% by volume aqueous ethanol solution | 7.1 |
| 5 | 90% by volume aqueous ethanol solution | 6.1 |

EXAMPLE 5

A high-density polyethylene [HI-ZEX 2208J (registered trade mark) manufactured and sold by Mitsui Petrochemical Co., Japan] having a density of 0.968 g/cm³ and a melt index, as measured in accordance with ASTM D1238, of 5.5 was extruded through an annular hollow fiber spinning nozzle having an annular orifice outside diameter of 33 mm and an annular orifice inside diameter of 27 mm (slit width: 3 mm) at a spinning temperature of 150° C. and a spinning rate of 400 m/min. The thus obtained preliminary hollow fiber was subjected to annealing at 120° C. for 2 hours. The annealed hollow fiber was then subjected to the following sequence of treatments while allowing the hollow fiber to travel. Thus, there was obtained a hydrophilic composite porous membrane in the form of a hollow fiber.

| (1) Cold stretching: | temperature of 25° C., stretching ratio of 33% based on the length of the fiber before stretching, annealed hollow fiber feed speed of 1.5 m/min |
|---|---|
| (2) Hot stretching: | 1st step |
| | temperature of 100° C. in air, stretching ratio of 300% based on the length of the fiber before the 1st hot stretching |
| | 2nd step |
| | temperature of 115° C. in air, stretching ratio of 147% based on the length of the fiber before the 2nd hot stretching (total stretching ratio of 440% based on the length of the fiber before stretching) |
| (3) Heat set: | temperature of 123° C., period of 10 sec |
| (4) Application of a copolymer solution | temperature of 50° C., solution feed speed per nozzle of 0.5 ml/min* run in air at 25° C., no air blow, period of 10 sec |
| (5) Drying: | temperature of 80° C., hot air oven, period of 15 sec |
| (6) Application of a copolymer solution: | Same as in (4) above |
| (7) Drying: | Same as in (5) above |
| (8) Final drying: | temperature of 100° C., hot air oven, period of 15 sec. |

*The hollow fiber matrix was coated, while allowing the hollow fiber to travel, with a solution prepared by dissolving Soarnol Z (vinyl alcohol unit content of 79% by weight) in a 50% by volume aqueous n-propanol solution in a concentration of 10 g/l which solution was fed from a nozzle disposed just above the matrix and a nozzle disposed just below the matrix.

The resulting hydrophilic composite porous membrane in the form of a hollow fiber had an inner diameter of 340 μm and a thickness of 50 μm, and exhibited a water permeability of 9.0 l/hr.m².mmHg and a permeability for 0.2 μm particle copolymer latex of 24%.

EXAMPLE 6

A high-density polyethylene [HI-ZE×2208J (registered trade mark) manufactured and sold by Mitsui Petrochemical Co., Japan] having a density of 0.968 g/cm³ and a melt index, as measured in accordance with ASTM D1238, of 5.5 was extruded through an annular hollow fiber spinning nozzle having an annular orifice outside diameter of 33 mm and an annular orifice inside diameter of 27 mm (slit width: 3 mm) at a spinning temperature of 150° C. and a spinning rate of 400 m/min. The thus obtained preliminary hollow fiber was subjected to annealing at 120° C. for 2 hours. The annealed hollow fiber was then cold stretched at a stretching ratio of 30% based on the length of the fiber before stretching at room temperature (25° C.), and hot stretched in two steps first at a stretching ratio of 200% based on the length of the fiber before stretching at 98°

C., followed by stretching at 110° C. (total stretching ratio in hot-stretching: 330%). Thus, there was obtained a polyethylene hollow fiber matrix having a porous structure. The obtained hollow fiber matrix had an inner diameter of 340 μm and a thickness of 50 μm. 840 pieces of the hollow fiber matrix were bundled to form a hollow fiber matrix bundle having a length of 30 cm. An ethylene-vinyl alcohol copolymer [Soarnol Z (registered trade mark) manufactured and sold by Nippon Synthetic Chemical Industry Co., Ltd., Japan) having an ethylene unit content of 29% by mole and a vinyl alcohol unit content of 79% by weight was dissolved in a 60% by volume aqueous ethanol solution at an elevated temperature to prepare a solution containing the copolymer at a concentration of 0.5% by weight. While maintaining the copolymer solution at a temperature of 50° C., the hollow riber matrix bundle was dipped in the copolymer solution for 5 minutes. After the removal of an excess of the copolymer solution, i.e. portion of the soltion which was retained between hollow fiber pieces, by giving vibration to the matrix bundle, the resulting bundle was dried with hot air having a temperature of 55° C. for 2 hours. The treatment with the copolymer solution and the drying step were repeated to obtain a bundle of composite hollow fiber membranes having a porous structure.

The composite porous membranes of the bundle each had an inner diameter of 340 μm and a thickness of 50 μm. The water permeability of the membranes was 9.5 l/hr m².mmHg and the permeability for a polymer latex having an average particle diameter of 0.2 μm was 29%.

The composite porous membrane bundle was accommodated in a polycarbonate columnar vessel having an inside diameter of 18 mm and a length of 220 mm. Both ends of the bundle were fixed to the vessel with a urethane adhesive. After cutting off the outermost portions of both ends of the bundle, nozzles were attached to both ends of the bundle to obtain a composite porous membrane module. The bundle within the thus obtained module had an effective length of 20.0 cm and an effective membrane area of 0.18 m². The space in the module was filled with sterile water, and the module was subjected to high-pressure steam sterilization at 121° C. for 30 minutes. Then, the performance as a plasma separator of the module was examined as follows. First the sterile water filled in the module was replaced by physiological saline. Then, bovine blood having a hematocrit value of 35% to which an ACD solution (citric acid—sodium citrate—dextrose solution) was added as an anticoagulant was passed through the module at a rate of 60 ml/min while maintaining the membrane differential pressure at 40 mmHg. Thus, plasma was collected. The time required for collecting 400 ml of plasma and the permeability for plasma component proteins are shown in Table 5. As is apparent from the table, the module exhibits an excellent performance as a plasma separator.

TABLE 5

| Time required for collecting 400 ml of plasma (min.) | Permeability for plasma component proteins[5] (%) | | | | |
|---|---|---|---|---|---|
| | Total protein | Alb[1] | IgG[2] | IgM[3] | Fib[4] |
| 22 | 98 | 98 | 99 | 100 | 98 |

Note:
[1] albumin
[2] immunoglobulin G
[3] immunoglobulin M
[4] fibrinogen
[5] $\frac{Ci}{Co} \times 100$ wherein Co represents the concentration of each plasma component protein of the original blood as measured according to customary procedures, and Ci represents the concentration of each plasma component protein of the 400 ml plasma separated from the original blood by means of the composite porous membrane.

EXAMPLE 7

A high-density polyethylene [HI-ZE×2208J (registered trade mark) manufactured and sold by Mitsui Petrochemical Co., Japan] having a density of 0.968 g/cm³ and a melt index, as measured in accordance with ASTM D1238, of 5.5 was extruded through an annular hollow fiber spinning nozzle having an annular orifice outside diameter of 33 mm and an annular orifice inside diameter of 27 mm (slit width: 3 mm) at a spinning temperature of 150° C. and a spinning rate of 400 m/min. The thus obtained hollow fibers were subjected to annealing at 115° C. for 2 hours. The annealed hollow fibers were then cold stretched at a stretching ratio of 30% based on the length of the fiber before stretching at room temperature (25° C.) and hot stretched at a stretching ratio of 400% based on the length of the fiber before stretching at 105° C. Thus, there were obtained hollow fiber matrixes having a porous structure. The obtained hollow fiber matrixes had an inner diameter of 330 μm and a thickness of 50 μm. Various kinds of block copolymers comprising hydrophilic monomeric units and hydrophobic monomeric units shown as in Table 6 were separately applied to the hollow fiber membrane matrixes to produce composite hollow fiber membranes having a porous structure.

A bundle of each of the obtained composite hollow fiber membranes was accommodated in a polycarbonate columnar vessel having an inside diameter of 24 mm. Both ends of each bundle were fixed to the vessel with a urethane adhesive to produce a composite hollow fiber membrane module in substantially the same manner as in Example 5. The bundle of hollow fiber membranes within the module had an effective length of 13 cm and an effective membrane area of 0.23 m². The module was sterilized with gaseous ethylene oxide to obtain a plasma separator. The plasma separating ability of the plasma separator was tested in substantially the same manner as in Example 5. The results, together with the hydrophilic blocks and hydrophobic blocks constituting the copolymer of the coat, the hydrophilic block content and the solvent employed for preparing the composite hollow fiber membranes, are shown in Table 6.

TABLE 6

| No. | Hydrophobic block | Hydrophilic block | Hydrophilic block content (% by weight) | Solvent used | Plasma separating ability (ml/min) |
|---|---|---|---|---|---|
| 1 | Polyethylene terephthalate | Polyethylene glycol (Carbwax 4000) | 60 | Hexafluoro-isopropanol | 12 |

TABLE 6-continued

| No. | Hydrophobic block | Hydrophilic block | Hydrophilic block content (% by weight) | Solvent used | Plasma separating ability (ml/min) |
|---|---|---|---|---|---|
| 2 | Polyethylene terephthalate | Polyethylene glycol (Carbwax 4000) | 85 | Hexafluoro-isopropanol | 15 |
| 3 | Bisphenol A polycarbonate | Polyethylene glycol (Carbwax 6000) | 60 | Dioxane | 11 |
| 4 | Nylon 11 | Polyethylene glycol (Carbwax 2000) | 60 | Trifluoro-ethanol | 12 |

Note

The block copolymer of polyethylene terephthalate and polyethylene glycol was prepared according to the melt condensation method as described in D. Coleman, J. Polym. Sci., 14, 19 (1954).

The block copolymer of bis phenol A polycarbonate and polyethylene glycol was prepared according to the solution phosgenation method as described in E. P. Gddberg, J. Polym. Sci., Part C 4, 707 (1964).

The block copolymer of nylon 11 and polyethylene glycol was prepared by heating a mixture of 50 g of 11-aminoundecanic acid, 150 g of polyethylene glycol having amino groups at both end thereof whose molecular weight was 2000 andadiic acid which was added in a molar amount equal to the number of moles of the polyethylene glycol. The heating was effected under nitrogen at 260° C. for 4 hours.

EXAMPLE 8

A high-density polyethylene [HI-ZE×2208J (registered trade mark) manufactured and sold by Mitsui Petrochemical Co., Japan] having a density of 0.968 g/cm$^3$ and a melt index, as measured in accordance with ASTM D1238, of 5.5 was extruded through an annular hollow fiber spinning nozzle having n annular orifice outside diameter of 33 mm and a annular orifice inside diameter of 27 mm (slit width: 3 mm) at an extrusion rate of 15 g/min, a spinning temperature of 150° C. and a spinning rate of 200 m/min. The fibrous extrudate was cooled with a wind of 0.5 m/sec in velocity. The thus obtained preliminary hollow fiber was subjected to annealling at 115° C. for 2 hours. By controlling the rotation speed of the feed roll, the annealed hollow fiber was then cold stretched at a stretching ratio of 30%, based on the length of the fiber before stretching, at room temperature (about 25° C.), and subjected to the following sequence of hot stretching operations:

(1) stretching at a stretching ratio of 310% based on the length of the fiber before hot stretching at 97° C., (2) stretching at a stretching ratio of 390% based on the length of the fiber before hot stretching at 113° C., and (3) stretching at a stretching ratio of 450% based on the length of the fiber before hot stretching at 115° C. The stretched hollow fiber was heat set at 115° C. for 2 min, thereby obtaining a polyethylene hollow fiber matrix having a porous structure. The matrix had substantially rectangular pores defined by microfibril bundles and knotted portions each having a stacked structure of lamellae as shown in FIGS. 3-5. The properties of the matrix are indicated in Table 7.

An ethylene-vinyl alcohol copolymer [Soarnol Z (registered trade mark) manufactured and sold by Nippon synthetic Chemical Industry Co., Ltd., Japan] having an ethylene unit content of 29% by mole was dissolved in a 60% by volume aqueous ethanol solution at an elevated temperature to obtain a solution containing the copolymer at a concentration of 1.0% by weight. While maintaining the copolymer solution at a temperature of 55° C., the above-obtained polyethylene hollow fiber matrix was bundled and dipped in the copolymer solution for 1 min. The matrix was taken out and dried by means of hot air having a temperature of 60° C. for 1.5 hours without applying any tension to the matrix to obtain a composite hollow fiber membrane comprising the polyethylene hollow fiber matrix and a copolymer coat. It was found that during the production of the composite hollow fiber membrane, the matrix shrank by 9.5%, and that the amount of the copolymer attached to the surface of the matrix was 9.3% by weight based on the weight of the matrix. As shown in FIGS. 1 to 2, in the composite hollow fiber membrane, several to several ten microfibrils were bonded together by means of the ethylene-vinyl alcohol copolymer to form a bundle having a columnar configuration with its diameter increased toward both end portions thereof from the middle portion thereof. Also as shown in FIGS. 1, 2 and 6, the pores and openings defined by the microfibril bundles and the knotted portions each having a stacked structure of lamellae which were substantially elliptic in cross section taken along the orientation direction of the matrix were uniformly arranged throughout the composite hollow fiber membrane. The tensile breaking strength and tensile breaking elongation of the membrane in the dry state were as excellent as 530 Kgf/cm$^2$ and 34%, respectively. The other properties of the composite hollow fiber membrane is indicated in Table 7. As is apparent from Table 7, the membrane exhibits an excellent water permeability and permeabilities for standard particles.

TABLE 7

| | | Matrix | Composite hollow fiber membrane |
|---|---|---|---|
| Hollow fiber | Inner diameter (μm) | 338 | 340 |
| | Membrane thickness μm) | 48 | 50 |
| | Porosity (%) | 78 | 75 |
| Average interval between knotted portions ls (μm) | Inner surface | — | 1.38 |
| | Center | — | 1.34 |
| | Outer surface | — | 1.40 |
| Average interval | Inner surface | — | 0.49 |

TABLE 7-continued

|  |  | Matrix | Composite hollow fiber membrane |
|---|---|---|---|
| between microfibril bundles db (μm) | Center | — | 0.50 |
|  | Outer surface | — | 0.52 |
| ls/db | Inner surface | — | 2.8 |
|  | Center | — | 2.7 |
|  | Outer surface | — | 2.7 |
| Standard particle permeability | 0.08 μm particle | 55 | 98 |
|  | 0.20 μparticle | 0 | 49 |
|  | 0.33 μm particle | 0 | 6.5 |
| Water permeability (l/hr · m² · mmHg) |  | 8.5* | 14.8 |
| Maximum pore diameter according to bubble point method |  | 0.41 | 0.63 |

*Pretreated with ethanol.

EXAMPLE 9

Composite porous hollow fiber membranes Nos. 1 to 5 were prepared in substantially the same manner as described in Example 8, except the hot stretching and matrix dipping procedures were carried out under the conditions indicated in Table 8. With respect to the membrane No. 5, after completion of the drying, the membrane was further sterilized at 120° C. for 30 min in high pressure steam in an autoclave. It was confirmed by an electron photomicrograph study that all of the composite porous hollow fiber membranes Nos. 1 to 5 had the pores and openings defined by the microfibril bundles and the knotted portions each having a stacked structure of lamellae which pores and openings were substantially elliptic in the cross section taken along the same direction as the longitudinal direction of the microfibril bundles and as viewed against the surface of the membrane, respectively. The properties of the composite porous hollow fiber membranes are indicated in Table 8.

TABLE 8

| Membrane No. | Hot stretching | | | Matrix dipping time in copolymer solution (min) | Bubble point max. diameter (μm) | Water permeability (l/hr · m² · mmHg) |
|---|---|---|---|---|---|---|
|  | 1st stage temp. (°C.) | 2nd stage temp. (°C.) | 3rd stage temp. (°C.) |  |  |  |
| 1 | 70 | 86 | 88 | 10 | 0.15 | 1.1 |
| 2 | 80 | 96 | 98 | 10 | 0.23 | 3.9 |
| 3 | 90 | 106 | 108 | 10 | 0.47 | 9.1 |
| 4* | 97 | 113 | 115 | 1 | 0.63 | 14.8 |
| 5 | 97 | 113 | 115 | 1 | 0.74 | 20.2 |

*Same as in Example 8.

What is claimed is:

1. A hydrophilic composite porous membrane comprising:
   microfibril bundles,
   knotted portions cross-connected to the microfibril bundles, and each having a stacked structure of lamellae, and
   a copolymer coat formed substantially on the overall surface of the microfibril bundles and the knotted portions,
   each microfibril bundle comprising a plurality of microfibrils bonded together by means of the copolymer,
   said microfibril bundles having thereon the copolymer coat cooperating with the knotted portions having thereon the copolymer coat to form a membranous structure having pores therewithin and openings on both surfaces thereof, the pores and the openings forming throughpaths running between both the surfaces of said membranous structure,
   said pores being substantially elliptic in the cross section taken along the same direction as the longitudinal direction of said microfibril bundles,
   said openings being substantially elliptic as viewed against the surface of said membranous structure,
   said microfibrils and the knotted portions being comprised of a polyolefin,
   said copolymer being water-insoluble and being comprised of hydrophilic monomeric units and hydrophobic monomeric units, and having a hydrophilic monomeric unit content of from 40 to 90% by weight based on the weight of the copolymer.

2. The membrane according to claim 1, wherein the polyolefin is polyethylene or polypropylene.

3. The membrane according to claim 1, wherein the coat covers at least 70% of the area of the overall surface.

4. The membrane according to claim 1, wherein the hydrophobic monomeric units are ethylene units.

5. The membrane according to claim 1, wherein the hydrophilic monomeric units are vinyl alcohol units.

6. The membrane according to claim 1, wherein the copolymer is an ethylene-vinyl alcohol copolymer.

7. The membrane according to claim 6, which is in the form of a hollow fiber.

8. The membrane according to claim 1, wherein said knotted portions are disposed at an average interval $\bar{l}s$ (μm) and the microfibril bundles are disposed at an average interval $\bar{d}b$ (μm), said $\bar{l}s$ and said $\bar{d}b$ satisfying the inequalities:

$$0.2 \leq \bar{l}s \leq 5,$$

$$0.1 \leq \bar{d}b \leq 3,$$

$$0.1 \leq \bar{l}s/\bar{d}b \leq 5.$$

9. The membrane according to claim 8, wherein said microfibril bundles are disposed at an average interval $\bar{d}bi$ (μm) at one surface portion of the membrane, at an average interval $\bar{d}bo$ (μm) at the other surface portion of the membrane and at an average interval $\bar{d}bc$ (μm) at the central portion of the membrane in the direction of the thickness of the membrane,
said $\bar{d}bi$, $\bar{d}bo$ and $\bar{d}bc$ satisfying the inequalities:

$$0.8 \leq \bar{d}bc/\bar{d}bi \leq 1.2,$$

$$0.8 \leq \bar{d}bc/\bar{d}bo \leq 1.2.$$

10. The membrane according to claim 1, which has an average pore diameter of from 0.02 to 1.0 μm.

11. The membrane according to claim 1, which is in the form of a hollow fiber.

12. The membrane according to claim 1, which is in the form of a flat membrane.

13. A method of producing a hydrophilic composite porous membrane comprising the steps of:
(1) applying, to an oriented polyolefin membranous matrix comprising a plurality of microfibrils oriented in the same direction as that of the orientation of the matrix and a plurality of knotted portions cross-connected to the microfibrils, the matrix having slits defined by the microfibrils and the knotted portions which slits are present in communicating relationship and form throughpaths running from one surface of the matrix to the other surface of the matrix, a solution of a water-insoluble copolymer comprised of hydrophilic monomeric units and hydrophobic monomeric units and having a hydrophilic monomeric unit content of from 40 to 90% by weight based on the weight of the copolymer in an organic solvent or a mixture of an organic solvent and water thereby to obtain an intermediate product in which the solution is attached to substantially the overall surface of the matrix, the overall surface including the surfaces of the microfibrils and the knotted portions and both surfaces of the matrix; and
(2) drying the intermediate product to remove said organic solvent or mixture of an organic solvent and water so that said copolymer forms a coat covering substantially the overall surface of the matrix to form a coated matrix, forming pores within the coated matrix which are present in communicating relationship and forming openings on both surfaces of said coated matrix, the openings communicating with the pores to form throughpaths running from one surface of the coated matrix to the other surface of the coated matrix.

14. The method according to claim 13, wherein said coated matrix comprises microfibril bundles, knotted portions cross-connected to the microfibril bundles and each having a stacked structure of lamellae, and a copolymer coat formed substantially on the overall surface of the microfibril bundles and the knotted portions, each microfibril bundle comprising a plurality of microfibrils bonded together by means of the copolymer, and wherein the pores and the openings are defined by the microfibril bundles having thereon the coat and the knotted portions having thereon the coat, and are substantially elliptic in the cross section taken along the same direction as the longitudinal direction of the microfibril bundles and as viewed against the surface of said coated matrix, respectively.

15. The method according to claim 13, wherein the sequence of said application of the solution and the drying is conducted one or more times.

16. The method according to claim 13, wherein said solution has a copolymer concentration of from about 0.1 to about 5% by weight, and the application of the solution is conducted at a temperature of from about 25° C. to about 100° C.

17. The method according to claim 13, wherein the application of the solution is performed by feeding the solution to the matrix from at least one nozzle disposed around the matrix.

18. The method according to claim 13, wherein the application of the solution is performed by dipping the matrix in the solution.

19. The method according to claim 13, wherein the application of the solution is performed by spraying the solution over the matrix.

20. The method according to claim 13, wherein said organic solvent is a member selected from the group consisting of dimethylsulfoxide, methanol, ethanol, 1-propanol, 2-propanol and mixtures thereof.

21. The method according to claim 13, wherein said application of the solution is performed while allowing the matrix to travel, and the drying is performed while allowing the intermediate product to travel.

22. The method according to claim 13, wherein said solution is applied to both the surfaces of the matrix.

23. The method according to claim 13, wherein said solution is applied to either of the surfaces of the matrix so that part of the solution on the applied surface permeates into the pores of the matrix to reach the other surface of the matrix, thereby to adhere to the overall surface.

24. The method according to claim 13, wherein said matrix is in the form of a hollow fiber.

25. A plasma separator comprising:
a vessel provided with a blood introduction means, a blood withdrawal means and a plasma withdrawal means; and
a plurality of porous hollow fibers which are contained within the vessel;
said blood introduction means and the blood withdrawal means communicating with each other through the plurality of porous hollow fibers fluid-tightly connected therebetween;
said hollow fiber being adapted to pass blood therethrough while causing the plasma component of the blood to be selectively passed through the walls of the hollow fibers and withdrawn through the plasma withdrawal means;
each hollow fiber comprising:
microfibril bundles,
knotted portions cross-connected to the microfibril bundles, and each having a stacked structure of lamellae, and
a copolymer coat formed substantially on the overall surface of said microfibril bundles and the knotted portions,
each microfibril bundle comprising a plurality of microfibrils bonded together by means of the copolymer,
the microfibril bundles having thereon said copolymer coat cooperating with the knotted portions having thereon the copolymer coat to form a membranous structure having pores therewithin and openings on both surfaces thereof, said pores and said openings forming throughpaths running between both the surfaces of the membranous structure,
the pores being substantially elliptic in the cross section taken along the same direction as the longitudinal direction of said microfibril bundles,
said openings being substantially elliptic as viewed against the surface of the membranous structure,
said microfibrils and the knotted portions being comprised of a polyolefin,
said copolymer being water-insoluble and being comprised of hydrophilic monomeric units and hydrophobic monomeric units, and having a hydrophilic monomeric unit content of from 40 to 90% by weight based on the weight of the copolymer.

* * * * *